US012775994B2

(12) United States Patent
Langtind et al.

(10) Patent No.: US 12,775,994 B2
(45) Date of Patent: Oct. 27, 2026

(54) GRAPHICS PROCESSING WITH OPTIONALLY DEFERRED GEOMETRY PROCESSING

(71) Applicant: Arm Limited, Cambridge (GB)

(72) Inventors: Frank Klaeboe Langtind, Melhus (NO); Anders Markus Kugler, Campbell, CA (US)

(73) Assignee: Arm Limited, Cambridge (GB)

( * ) Notice: Subject to any disclaimer, the term of this patent is extended or adjusted under 35 U.S.C. 154(b) by 94 days.

(21) Appl. No.: 18/613,529

(22) Filed: Mar. 22, 2024

(65) Prior Publication Data

US 2025/0299283 A1 Sep. 25, 2025

(51) Int. Cl.
*G06T 1/20* (2006.01)
*G06T 15/00* (2011.01)

(52) U.S. Cl.
CPC .............. *G06T 1/20* (2013.01); *G06T 15/005* (2013.01)

(58) Field of Classification Search
CPC ........... G06T 1/20; G06T 1/60; G06T 15/005; G06T 15/80
USPC .......................................................... 345/506
See application file for complete search history.

(56) References Cited

U.S. PATENT DOCUMENTS 9,779,536 B2 10/2017 Engh-Halstvedt
2004/0130552 A1 7/2004 Duluk, Jr.
2014/0139534 A1 5/2014 Tapply
2015/0379672 A1* 12/2015 Wang ...................... G06T 15/80 345/423
2016/0005140 A1 1/2016 Engh-Halstvedt
2016/0148424 A1* 5/2016 Chung .................... G06T 11/40 345/506
2016/0358307 A1 12/2016 Brothers
2020/0193703 A1 6/2020 Favela
2021/0065422 A1 3/2021 Croxford
2022/0245751 A1 8/2022 Langtind
2022/0319111 A1 10/2022 Uhrenholt
2023/0132068 A1 4/2023 Klock
2025/0299282 A1 9/2025 Langtind

FOREIGN PATENT DOCUMENTS

WO WO-2022084666 A1 * 4/2022 ........... G06T 15/005

OTHER PUBLICATIONS

U.S. Appl. No. 18/897,828, filed Sep. 26, 2024.
(Continued)

*Primary Examiner* — Jacinta M Crawford
(74) *Attorney, Agent, or Firm* — Pearl Cohen LLP

(57) ABSTRACT

When executing a tile-based graphics processing pipeline, one or more geometry processing stages of a sequence of one or more geometry processing stages of the graphics processing pipeline generate packets storing data for geometry to be processed. For each packet, it is determined whether to defer some geometry processing until a rendering stage. When it is determined to defer some of the geometry processing for a packet, an indication that further geometry processing should be performed for the packet at the rendering stage is associated with the packet. When it is not determined to defer geometry processing for a packet, all of the sequence of one or more geometry processing stages are performed for the packet before providing the packet to a binning stage.

18 Claims, 18 Drawing Sheets

(56) References Cited

OTHER PUBLICATIONS

U.S. Appl. No. 18/897,848, filed Sep. 26, 2024.
Non-final Office Action dated Sep. 25, 2025, U.S. Appl. No. 18/613,436, filed Mar. 22, 2024.
Response to Office Action dated Jan. 26, 2026, U.S. Appl. No. 18/613,436, filed Mar. 22, 2024.
Non-final Office Action dated Apr. 24, 2026, U.S. Appl. No. 18/897,828, filed Sep. 26, 2024.
Non-final Office Action dated May 4, 2026, U.S. Appl. No. 18/897,848, filed Sep. 26, 2024.
Non-final Office Action dated May 13, 2026, U.S. Appl. No. 18/613,436, filed Mar. 22, 2024.

* cited by examiner

GRAPHICS PROCESSING WITH OPTIONALLY DEFERRED GEOMETRY PROCESSING

BACKGROUND

The technology described herein relates to graphics processing, and in particular to tile-based graphics processing.

Graphics processing is normally carried out by first splitting a scene (e.g. a 3D model) to be rendered (e.g. for display) into a number of similar basic components or "primitives", which primitives are then subjected to the desired graphics processing operations. The graphics primitives are usually in the form of simple polygons such as triangles, quadrilaterals, points, lines or groups thereof.

Each primitive is usually defined by and represented as a set of vertices (e.g. three vertices in the case of a triangular primitive). The vertices that are to be used for the primitives will have respective sets of vertex data defining the vertices, e.g. the relevant attributes for each of the vertices. These attributes will typically include position data and other, non-position data (varyings), e.g. defining colour, light, normal, texture coordinates, etc., for the vertex in question.

In tile-based graphics processing, the two-dimensional graphics processing (render) output (i.e. the output of the rendering process, such as an output frame to be displayed) is generated (rendered) as a plurality of smaller area regions, usually referred to as "tiles". The render output is typically divided (by area) into regularly-sized and shaped rendering tiles (they are usually e.g. squares or rectangles). The tiles are each rendered separately (e.g. one after another). The rendered tiles are then combined to provide the complete render output (e.g. frame for display).

When performing tile-based graphics processing, there will normally be some initial geometry processing, such as vertex processing (vertex shading) of attributes for vertices to be used for primitives for the render output being generated, to generate geometry (and other) data required for rendering the graphics processing output.

The geometry processing will then be followed by a tiling/binning process that generates appropriate data structures for determining which geometry (e.g. primitives) needs to be processed for respective rendering tiles of the output being generated.

(In tile-based graphics processing, it is usually desirable to be able to (try to) identify the geometry (e.g. primitives) for the render output that need to be processed for a given rendering tile (so as to avoid unnecessarily processing geometry that does not actually apply to a rendering tile). To facilitate this, in tile-based graphics processing, there is usually a tiling/binning process that is performed that generates appropriate data structures, such as lists of primitives that apply to a tile or tiles, for use then to identify geometry that need to be processed for a respective rendering tile.)

Once the binning/tiling process has generated the necessary data structures for identifying geometry to be processed for respective tiles of the render output, the geometry can then be, and will be, subjected to appropriate rendering/fragment processing. This may comprise, for example, rasterising primitives to be processed to fragments, fragment shading of the fragments, and/or performing ray tracing operations. This operation is performed on a tile-by-tile basis, using the data structures generated by the tiling/binning process to identify the geometry (e.g. primitives) that need to be processed for a respective rendering tile.

The rendered tiles may then be combined appropriately to provide the overall render output (e.g. frame for display).

The Applicants believe that there remains scope for improvements to the operation of tile-based graphics processors and tile-based graphics processing.

BRIEF DESCRIPTION OF THE DRAWINGS

Embodiments of the technology described herein will now be described by way of example only and with reference to the accompanying drawings, in which.

Like reference numerals are used for like features in the Figures, where appropriate.

DETAILED DESCRIPTION

Figure 1:
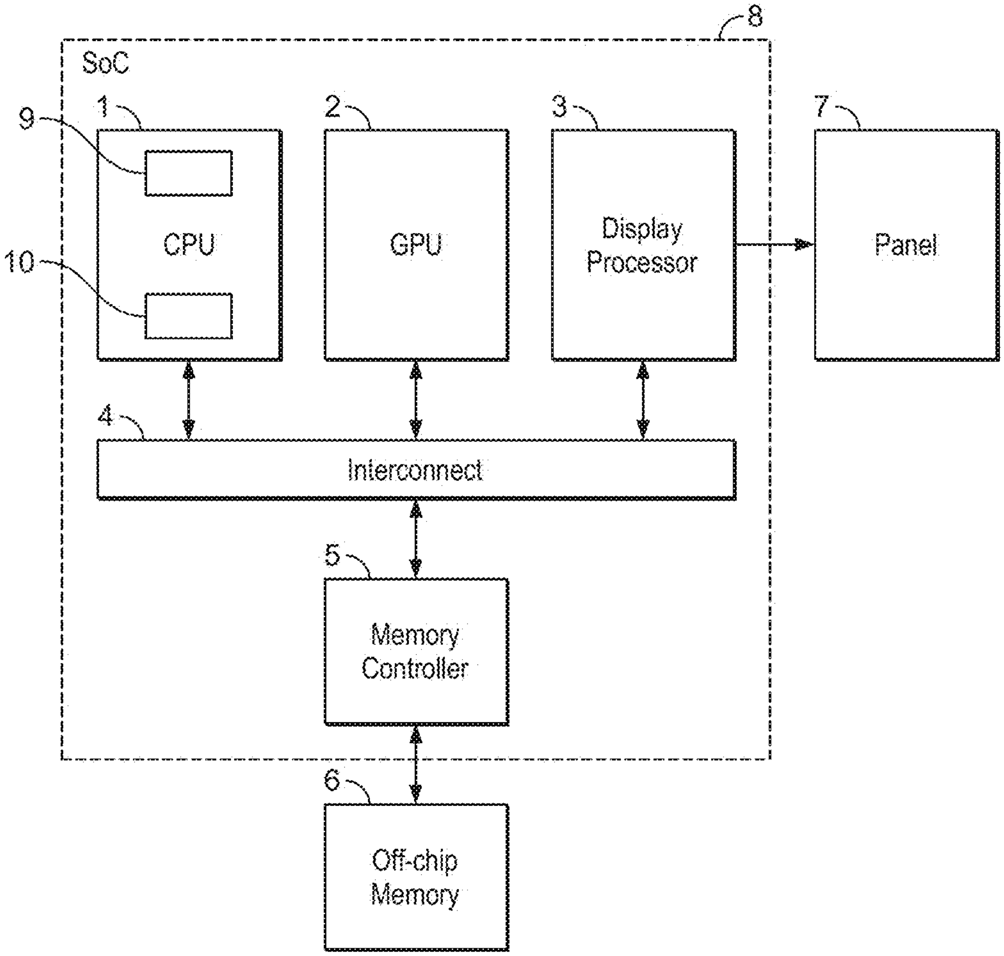
FIG. 1 shows an exemplary data processing system in which the technology described herein may be implemented.

A first embodiment of the technology described herein comprises a method of operating a graphics processor when executing a tile-based graphics processing pipeline to generate an output, the graphics processing pipeline being executed comprising:

- a sequence of one or more geometry processing stages to perform geometry processing;
- a binning stage that generates data structures for identifying geometry to be processed for respective rendering tiles of a render output being generated; and
- a rendering stage for rendering tiles of a render output being generated;

the method comprising:

- performing at least some geometry processing of the sequence of one or more geometry processing stages of the graphics processing pipeline to generate respective packets for processing, each packet storing data for geometry to be processed;
- determining, for a packet, whether to defer some of the geometry processing of the sequence of one or more geometry processing stages of the graphics processing pipeline being executed until the rendering stage;
- when it is determined to defer some of the geometry processing for a packet to the rendering stage, associating with the packet an indication that further geometry processing should be performed for the packet at the rendering stage; and
- when it is other than determined to defer geometry processing for the packet to the rendering stage, performing all of the sequence of one or more geometry processing stages for the graphics processing pipeline being executed for the packet before providing the packet to the binning stage.

A second embodiment of the technology described herein comprises a graphics processor comprising:

processing circuits configured to execute a tile-based graphics processing pipeline to generate an output, the graphics processing pipeline being executed comprising:

a sequence of one or more geometry processing stages to perform geometry processing;

a binning stage that generates data structures for identifying geometry to be processed for respective rendering tiles of a render output being generated; and a rendering stage for rendering tiles of a render output being generated;

wherein:

the geometry processing stage or stages of the graphics processing pipeline generate respective packets for processing, each packet storing data for geometry to be processed;

the graphics processor further comprising:

a processing circuit configured to:

determine, for a packet, whether to defer some of the geometry processing of the sequence of one or more geometry processing stages of the graphics processing pipeline being executed until the rendering stage;

when it is determined to defer some of the geometry processing for a packet to the rendering stage, associate with the packet an indication that further geometry processing should be performed for the packet at the rendering stage; and when it is other than determined to defer geometry processing for the packet to the rendering stage, trigger the performing of all of the sequence of one or more geometry processing stages for the graphics processing pipeline being executed for the packet before providing the packet to the binning stage.

The technology described herein relates to tile-based graphics processing. In the technology described herein, the geometry processing (prior to the binning stage) operates to generate respective (geometry) packets, each containing data for geometry to be processed.

In the technology described herein, it is determined whether to defer some of the geometry processing for a packet until the rendering stage.

The Applicants have recognised in this regard that, as will be discussed further below, not all of the geometry processing for packets storing data for geometry to be processed for a render output needs to be performed in advance of and for the binning/tiling stage in a tile-based graphics processing pipeline, but rather some of that processing can, where appropriate, be deferred until the rendering/fragment processing stage of the graphics processing pipeline (and, e.g., and in an embodiment, until it has been determined that a packet storing data for geometry to be processed for a render output actually applies to a rendering tile).

In other words, in the technology described herein, at least some of the geometry processing that should be performed for a packet storing data for geometry to be processed for a render output can be (and where appropriate is) deferred until the rendering stage (e.g. after it has been determined that the packet in question should be processed for a rendering tile).

By deferring geometry processing to the rendering stage, the need to store the result of that geometry processing from the geometry processing stage until it is required by the rendering stage is avoided.

The Applicants have recognised in this regard that a large part of the memory bandwidth that is consumed when performing tile-based graphics processing relates to the need to store (intermediate) geometry data that has been generated by the geometry processing to memory between the geometry processing and the rendering/fragment processing.

The technology described herein, by allowing (some of the) geometry processing to be deferred until the rendering stage, can remove the need to store the result of that geometry processing in memory from the geometry processing prior to binning for later use by the rendering stage (which would be the case where all the geometry processing is performed prior to binning).

Thus the operation in the manner of the technology described herein facilitates reducing the memory bandwidth that is required for the overall graphics processing pipeline execution, for example, by, in effect, generating data from geometry processing at a later stage in the graphics processing pipeline (and correspondingly "closer" to the point where that data will be used). This can also accordingly facilitate storing that geometry processing data "locally" to the graphics processing stage where it is required/used, without the need, for example, for it to be stored in a longer term fashion, for example in (main) memory for later use.

Furthermore, at least some of the geometry processing that is performed in a deferred manner (at the rendering stage) can be, and is in an embodiment, omitted from the initial geometry processing operation (prior to the binning stage). This will then allow the amount of geometry processing that is initially performed to be reduced. Furthermore, that geometry processing for packets that in fact are not required for any rendering tiles can be omitted completely.

The geometry processing that is and can be performed in the technology described herein can comprise any suitable and desired sequence of one or more geometry processing stages that may be performed as part of a graphics processing pipeline.

In an embodiment, the geometry processing comprises one or more of, and in an embodiment plural of, the following geometry processing stages: a position shader (position shading); a vertex shader (vertex shading); a tessellation control shader (tessellation control shading); a task shader (task shading); a tessellation shader (tessellation shading); a mesh shader (mesh shading); a tessellation evaluation shader (tessellation evaluation shading); a geometry shader (geometry shading); and a transform feedback shader (transform feedback shading). The geometry processing may comprise one or more of these shader stages, as desired.

The sequence of one or more geometry processing stages is in an embodiment implemented and executed as a geometry processing pipeline, comprising the sequence of one or more geometry processing stages in question.

The geometry processing generates respective (geometry) packets that each store data for geometry to be processed (for the render output in question).

In an embodiment a (and each) (geometry) packet that the geometry processing generates stores data for a set of one or more primitives (and in an embodiment for a set of plural primitives) to be processed (for the render output in question).

Each (geometry) packet may store any suitable and desired data for the geometry (e.g. set of one or more primitives) that it relates to. For example, a (geometry) packet may, and in an embodiment does, store appropriate attributes, such as positions and varyings, for a set of (in an embodiment plural) vertices for the geometry (e.g. set of primitives) that the packet relates to, for example, and in an embodiment, together with a set of identifiers (indices) for the vertices that can be used to determine how the vertices are used for the geometry (e.g. primitives) that the packet relates to. A packet may also store attributes and identifiers for the geometry, e.g. primitives, itself, if desired, and/or other, e.g., state, information relating to the geometry that the packet relates to.

Other arrangements would, of course, be possible.

The initial (geometry) packets that are generated by the geometry processing may be created in any suitable and desired manner. For example geometry and/or work items (e.g. vertices) relating to that geometry may be progressively added to a packet, e.g. until a condition for finishing the packet (and, if necessary, starting a new packet), such as a maximum amount of geometry and/or work items for the packet being met, is reached.

In an embodiment, each respective geometry processing stage of the sequence of one or more geometry processing stages for the geometry processing (pipeline) that is being executed, generates a respective geometry packet, and provides that respective geometry packet as an input packet to a next geometry processing stage of the sequence (if any), with that next geometry processing stage of the sequence then processing the input packets that it receives to generate one or more output geometry packets, that are then provided as inputs to a next geometry processing stage of the sequence (if any), and so on.

Thus, in an embodiment, the first stage of the geometry processing, which in an embodiment comprises position shading or vertex shading (comprising both position shading and varying shading, for example), acts as an "input packetizer" that generates initial packets storing data for geometry to be processed. These initial geometry packets are then in an embodiment appropriately processed by (any) subsequent stages of the geometry processing to generate, for example, modified versions of the initial geometry packets and/or to generate additional geometry packets, as required. For example, a mesh shader may generate multiple packets from a single input (e.g. task shader) packet.

The geometry processing that is (potentially) deferred to the rendering stage (from the geometry processing prior to the binning stage) may be any suitable and desired geometry processing (geometry processing stage) that is to be performed as part of the overall geometry processing sequence (pipeline) for the graphics processing pipeline being executed. In an embodiment, it comprises the last (final) geometry processing stage of the sequence of geometry processing stage(s) that are to be performed for the graphics processing pipeline being executed.

Thus in an embodiment, the geometry processing that is (potentially) deferred to the rendering stage comprises one or more, and in an embodiment the last one, of the geometry processing stages of the sequence of one or more geometry processing stages that are to be performed for the graphics processing pipeline being executed.

Thus, in the case where the sequence of one or more geometry processing stages for the graphics processing pipeline being executed comprises N geometry processing stages (where N is an integer greater than zero), the method of the technology described herein in an embodiment comprises (and the graphics processor is correspondingly in an embodiment configured to) determining whether to defer the Nth geometry processing stage until the rendering stage, and when it is determined to defer the Nth geometry processing stage until the rendering stage, performing N−1 of the geometry processing stages of the sequence of N geometry processing stages of the graphics processing pipeline being executed to generate respective (geometry) packets for processing by the binning stage (prior to the binning stage).

In an embodiment, the geometry processing that is (potentially) deferred to the rendering stage comprises one of: a vertex shader (vertex shading); a mesh shader (mesh shading); a tessellation evaluation shader (tessellation evaluation shading); a geometry shader (geometry shading); or a transform feedback shader (transform feedback shading). Various arrangements would however be possible.

The geometry processing that is (potentially) deferred from the initial geometry processing could comprise only some but not all of the relevant geometry processing stage, but in an embodiment, all of the relevant processing for the geometry processing stage in question is deferred to the rendering stage.

Correspondingly, in an embodiment, at least some of the geometry processing that is determined to be deferred to the rendering stage is not performed (is other than performed) as part of the geometry processing prior to the binning stage for a packet (is omitted from the geometry processing for a packet prior to the binning stage).

Thus, in the case where it is determined to defer some of the geometry processing for a packet until after the binning stage, then in an embodiment at least some of the geometry processing that is being deferred is not performed (is omitted) prior to the binning stage.

It would be possible in this regard for only some but not all of the relevant (deferred) geometry processing for the geometry processing stage to be omitted (not performed) prior to the binning stage, but in an embodiment none of the geometry processing that will be deferred to the rendering stage is performed as part of the geometry processing prior to the binning stage (all of the geometry processing for the geometry processing stage in question is deferred to the rendering stage).

As discussed, in an embodiment the geometry processing that is (potentially) deferred until the rendering stage comprises the last stage of the sequence of one or more geometry processing stages to be performed for the graphics processing pipeline being executed.

Thus, in an embodiment, the method of the technology described herein comprises (and the graphics processor comprises a processing circuit or circuits configured to):

- determining whether to defer until the rendering stage a last stage of the sequence of one or more geometry processing stages to be performed for the graphics processing pipeline being executed for a (geometry) packet generated by any preceding stages of the sequence of geometry processing stages; and
- when it is determined to defer the last geometry processing stage for a packet, not performing the last geometry processing stage for the packet as part of the sequence of geometry processing prior to the binning stage; and
- when it is determined not to (to other than) defer the last stage of the sequence of geometry processing, performing that last stage of the sequence of geometry processing prior to the binning stage.

It can be determined whether some of the geometry processing should be deferred for a packet in any suitable and desired manner, and based on any suitable and desired conditions and criteria. In an embodiment, there are one or more, and in an embodiment plural, conditions that must be met for the geometry processing for a packet to be deferred.

In an embodiment, the decision takes account of, and is based on, whether the geometry processing that is (potentially) to be deferred will result in less (intermediate) data from that geometry processing needing to be stored until the rendering stage, as compared to the amount of (intermediate) data that would need to be stored until the rendering stage in the case that the geometry processing is deferred. For example, a mesh shader may generate plural output packets from a single input packet, and so it may be preferable to defer mesh shading where possible and appropriate, so as to reduce the amount of (intermediate) data that has to be stored.

In an embodiment, geometry processing for a packet is not deferred (is other than deferred) when a bounding box for the packet (the footprint of the bounding box for the packet in screen space) is larger than a particular, in an embodiment selected, in an embodiment predetermined, threshold size.

The threshold size that the bounding box for a packet must be smaller than for geometry processing for a packet to (potentially) be deferred may be any suitable and desired size, and may be represented and considered in any suitable and desired manner. In an embodiment, the threshold bounding box size (area) is defined as, and comprises, a set of x*y rendering tiles. Thus, for example, the threshold size could be set such that the geometry processing for a packet will not be deferred if the bounding box for the packet is not fully within a single rendering tile, or a 2×1 group of rendering tiles, or a 2×2 group of rendering tiles, etc., as desired.

In an embodiment, the permitted maximum size for a packet bounding box for geometry processing for the packet to (potentially) be deferred can be, and is in an embodiment, set (configurable) in use, for example, and in an embodiment, on render output-by-render output basis. This would then facilitate, for example, more flexible control of the deferring of geometry processing for packets depending on the particular render outputs being generated. In this case, the, e.g., driver for the graphics processor may be operable to set the permitted maximum bounding box size above which geometry processing for a packet will not be deferred (for the render output in question).

Constraining the size of packets for which geometry processing can (potentially) be deferred to the rendering stage can, for example, reduce the likelihood of having to perform any deferred geometry processing multiple times at the rendering stage (for example where a packet falls to be processed for plural rendering tiles).

In an embodiment, the determination and decision as to whether to defer some of the geometry processing for a packet to the rendering stage also or instead, and in an embodiment also, takes account of, and is based, on the amount of data that would be generated and accordingly need to be stored at the rendering stage when performing the deferred geometry processing.

The Applicants have recognised in this regard that when performing geometry processing at the rendering stage, it would be desirable (and advantageous) to be able to store, if at all possible, all of the data that is generated by that deferred geometry processing locally on the graphics processor while the rendering is being performed, so as to avoid the need to store such data in main memory, for example.

By considering the amount of data that would be generated by the deferred geometry processing, it can be more reliably ensured that any data generated by the deferred geometry processing will be able to be stored locally (on-chip) at the rendering stage and not need to be “spilled” to main memory, for example.

This condition for whether or not to defer geometry processing for a packet could be based simply on an estimate of the amount of data that the deferred geometry processing for the packet in question will produce. In an embodiment, there is a threshold amount of data capacity set, and it is determined whether the (estimated) amount of data that would be produced if geometry shading for a packet were to be deferred to the rendering stage together with any estimated data for packets for the render output in question that have already had their geometry processing set to be deferred to the rendering stage would exceed the permitted “deferred geometry processing” data capacity threshold or not.

Thus, in an embodiment, the method of the technology described herein comprises (and the graphics processor is correspondingly configured to) determine whether deferring the geometry processing for a packet will risk exceeding a threshold data capacity set for the storing of data for deferred geometry processing for packets at the rendering stage, and if deferring the geometry processing for the packet will exceed (risk exceeding) the data storage capacity threshold, determining not to defer geometry processing for the packet to the rendering stage.

In these arrangements there could simply be a permitted “deferred geometry processing” data storage capacity set for the whole of the render output being generated (and in one embodiment that is what is done).

However, in an embodiment, the render output is processed as plural regions (is divided into plural smaller regions for the rendering processing), and is processed on a region-by-region basis. In this case, there is in an embodiment a permitted (maximum) deferred geometry processing data capacity for a (and each) respective region of the render output, and so the necessary data capacity, etc., will be considered on a region-by-region basis. In this case therefore, it would be considered for each respective region whether the deferred geometry processing data capacity has been exceeded for the region in question or not.

Thus, in an embodiment, a render output is divided into a plurality of regions for the purposes of determining whether to defer some of the geometry processing for packets to the rendering stage.

Correspondingly, the determining of whether to defer some of the geometry processing for a packet is in an embodiment based on, and takes account of the sub-division of the render output into regions for that purpose, for example, and in an embodiment, in terms of the amount of geometry processing that has already been deferred for a given region, and/or in terms of whether a packet falls entirely within a single region or not (as discussed below).

The sub-division of a render output into regions for this purpose can be made in any suitable and desired manner. For example, the render output may simply be divided into a plurality of equally sized (equal area) regions. Each region in an embodiment corresponds to an integer number of rendering tiles.

In an embodiment, the division into regions for this purpose is based on an estimate of the amount of deferred geometry and other processing that will be required for a and each region. Most in an embodiment this is also or instead (and in an embodiment also) based on a known storage (memory) capacity for storing such deferred geometry data available to the graphics processor, with the region sizes then being set so as to try to avoid exceeding that storage capacity. The expected amount of deferred geometry and other processing for a region may be estimated, for example, by deriving from the binning data structures prepared by the binning stage, an indication (estimation), for example, of the number of packets to be processed for, and/or for which geometry processing has been deferred, for different regions of the render output.

In these arrangements, the maximum permitted deferred geometry processing data capacity for each region is in an embodiment set to be the same, but that need not necessarily be the case.

The amount of data that deferred geometry processing for a packet will generate, and correspondingly any maximum permitted deferred geometry processing data capacity that is set, may be assessed and considered in any suitable and desired manner, and using any suitable and desired measure (estimate) of the data that will be produced by deferred geometry processing of packets.

For example, it could simply be assumed that each packet will produce the same amount of data if its geometry processing is deferred, in which case the assessment and determination could simply keep a count of how many packets have had their geometry processing deferred for a region (or the render output as a whole, as appropriate), and when that count reaches a permitted maximum (threshold) number of packets, any further packets for the region/render output in question will not have their geometry processing deferred. In one embodiment, this is what is done.

The effect of this then will be that for a given region of the render output, the geometry processing for (appropriate) packets will initially be allowed to be deferred to the rendering stage (and set to be deferred to the rendering stage), but once a sufficient number of packets for the region have had their geometry processing deferred, all later packets for the region will not have their geometry processing deferred.

Thus, in an embodiment of the technology described herein, the method of the technology described herein comprises (and the graphics processor comprises processing circuits configured to) for a render output being generated, dividing the render output into a plurality of regions for the purposes of determining whether to defer geometry processing for packets; and

- for each region that the render output has been divided into, maintaining a count of the number of packets for which geometry processing has been deferred to the rendering stage; and
- when the count of packets for which geometry processing has been deferred for a region reaches a permitted threshold value, not (other than) deferring the geometry processing of any more packets for the render output for the region in question.

It would also be possible to perform a more sophisticated estimate of the amount of data that would be produced when performing deferred geometry processing for a packet, if desired (with the threshold storage capacity being set and measure accordingly). For example, an indication of the content of a packet, for example, in terms of the number of primitives and/or vertices that it contains, could be used to provide a more accurate estimate of the amount of data that may be generated when performing deferred geometry processing for a packet. In this case therefore, rather than simply maintaining a count of packets for which the geometry processing has been deferred, a tally of the estimated amount of data that would be produced by the deferred geometry processing for packets whose geometry processing has been deferred will be maintained, and compared to a threshold amount of data for the region/render output in question.

In the case where the render output being generated is divided into respective regions for processing in this manner, in an embodiment when (if) a packet (its bounding box) extends into more than one region (crosses region boundaries), then the geometry processing for a packet is not deferred, but rather all the geometry processing for the packet is performed prior to the binning stage. This will then avoid having to perform “deferred” geometry processing for a packet for multiple regions at the rendering stage.

Thus, in an embodiment, geometry for processing for a packet is only (potentially) deferred when a packet is wholly contained within a single region of the render output.

Thus, in an embodiment, the determination of whether to defer some of the geometry processing for a packet comprises one or more of, in an embodiment plural of, and in an embodiment all of:

- determining whether the bounding box for a packet is greater than a maximum permitted bounding box size;
- determining whether the bounding box for a packet extends over plural regions that the render output has been divided into for the purposes of considering whether to defer the geometry processing for packets; and
- determining whether the amount of data generated when performing deferred geometry processing for a packet together with the amount of data that will be generated by performing deferred geometry processing for packets whose geometry processing has already been deferred for a region that the render output has been divided into for the purposes of considering whether to defer the geometry processing for packets will exceed a threshold permitted amount of data to be generated by performing deferred geometry processing for packets for the region of the render output in question.

When any one of these conditions is met, then in an embodiment, it is determined not to (to other than) defer geometry processing for the packet (but when none of them are met, geometry processing for the packet is deferred).

It will be appreciated from the above, that in embodiments of the technology described herein at least, the decision as to whether or not to defer geometry shading for a packet to the rendering stage will use and be based on a bounding box for the packet in its form at which the decision as to whether to defer geometry processing or not is being made.

The bounding box for a packet for this purpose can be determined in any suitable and desired manner.

In the case where the necessary information for determining a bounding box for the packet in its “current” form is available from the geometry processing that has been performed, then that information from the geometry processing that has been performed again can be, and is in an embodiment, used to determine a bounding box for the packet in question.

However, the Applicants have recognised that in the case where a (the final) geometry processing stage is (potentially) to be deferred for a packet, then in that case, the necessary information to determine the bounding box for a packet may not be available from the geometry processing that has been completed as part of the geometry processing. In this case, the bounding box for a packet can be determined in any suitable and desired manner.

For example, any necessary geometry processing, such as position/vertex shading, that is required to provide appropriately processed (transformed) vertex positions for vertices for primitives in the packet to allow a bounding box for the packet to be determined could be performed (and in one embodiment, that is the case). Thus, in this case, when the (final) stage of geometry processing is (potentially) to be deferred for a packet, in an embodiment some geometry processing, such as position shading of vertices for primitives of the packet, is still performed, to allow a bounding box for the packet to be determined (but the complete geometry processing for the final stage of the geometry processing that is to be deferred will not be performed (yet)).

Correspondingly, in this case, any results of any, e.g. vertex position shading, that is performed at this time to derive a bounding box for a packet is in an embodiment discarded (is not retained) once the bounding box for the packet has been determined (in the case where geometry shading for the packet is being deferred).

The Applicants have recognised in this regard that while this operation may require additional geometry processing, as the, e.g. vertex position shading, may also need to be performed as part of the deferred geometry processing at the rendering stage, this operation will still have benefits in respect of reducing the amount of intermediate data that needs to be stored from the geometry processing for use at the rendering stage, thereby still having the benefit of reducing the memory bandwidth for the overall graphics processing pipeline operation.

In an embodiment, the bounding box for a packet is determined without (with other than) needing to perform (and performing) any position shading for vertices for primitives in the packet (where that information is not already available from the geometry processing that has been performed).

In one such embodiment, the bounding box is derived using information, e.g., and in an embodiment, from the application for which the graphics processing being performed (application-supplied information), for example, and in an embodiment, that defines a bounding volume for the packet and a way to transform the bounding volume to derive a bounding box for the packet. In this case therefore, there will be appropriate (meta) data associated with the packet, in an embodiment provided by the application, e.g. that defines a bounding volume for the packet and the way to transform the bounding volume to determine a bounding box for the packet. This information can then be used to determine a bounding box for the packet in question.

In an embodiment, the bounding box for a packet can also or instead, and in an embodiment also, be determined from information that has been generated by a geometry processing stage or stage that has already been executed for the packet (and that precedes the geometry processing stage that is (potentially) being deferred). This information can comprise any suitable and desired information that can allow a bounding box for a packet to be determined.

For example, in the case of a tessellation shader, the tessellation output may consist of barycentric coordinates (which will be expanded to vertices and primitives in a tessellation evaluation shader). In this case, the tessellation shader may be configured to provide the bounding volume in barycentric coordinates, with the tessellation evaluation shader being configured to transform those coordinates into screen space bounding box coordinates (which will then provide a bounding box for the packet in question).

Other arrangements would, of course, be possible.

In an embodiment, the possibility of deferring geometry processing in the manner of the technology described herein can be selectively enabled, in an embodiment on a render output-by-render output (e.g. draw call) basis. Thus, for example, and in an embodiment, the possibility of deferring geometry processing is able to be set globally for a given render output (e.g. draw call), such that where deferred geometry processing in the manner of the technology described herein is not enabled for a render output, all the geometry processing for respective (geometry) packets will be performed as part of the geometry processing prior to the binning stage. On the other hand, where deferred geometry processing is enabled for a render output, then the process of determining, e.g. on a packet-by-packet basis, whether the geometry processing should be deferred will be enabled (and performed for each (geometry) packet) for the render output in question).

The decision as to whether to defer some of the geometry processing (e.g. the last geometry processing stage) for a packet may be performed for particular, selected packets only. In an embodiment, it is done (when enabled) for each and every packet that is produced by the geometry processing for a (the) render output being generated. Thus this will in an embodiment be done for plural, and in an embodiment for all, of the packets for a given render output being generated.

Thus, in an embodiment, the method of the technology described herein comprises (and the graphics processor comprises a processing circuit(s) configured to):

for each packet that is generated for a render output being generated:

- determining whether to defer some of the geometry processing of the sequence of one or more geometry processing stages of the graphics processing pipeline being executed until the rendering stage;
- when it is determined to defer some of the geometry processing for the packet to the rendering stage, associating with the packet an indication that further geometry processing should be performed for the packet at the rendering stage; and
- when it is other than determined to defer geometry processing for the packet to the rendering stage, performing all of the sequence of one or more geometry processing stages for the graphics processing pipeline being executed for the packet before providing the packet to the binning stage.

When geometry processing for a packet is deferred, the packet is indicated as having had (some of) its geometry processing deferred (so that such a "deferred" packet can then be identified at the rendering stage). This indication can take any suitable and desired form, but is in an embodiment in the form of an indicator that can be used to indicate that geometry processing for the packet has been deferred (and so needs to be performed, where appropriate, at the rendering stage).

In an embodiment, this indication is associated with (and stored with) the packet in its entry or entries in the appropriate binning data structure or structures that the binning stage generates. Thus, for example, and in an embodiment, where the binning stage generates (hierarchies of) bounding boxes, for a packet for which geometry processing has been deferred, the binning data structure will store a bounding box for the packet, an indicator (e.g. flag) indicating that geometry processing for the packet has been deferred, and any required state information for performing the deferred geometry processing for the packet.

Other arrangements would, of course, be possible.

In the case where geometry processing for a packet is deferred, then in an embodiment, any information and data necessary for the later performance of the geometry processing (for performing the deferred geometry processing (stage)) is stored appropriately, so as to allow the deferred geometry processing to be performed later, at the rendering stage.

This data can be any suitable and desired data that will be needed for performing the geometry processing at the rendering stage. In an embodiment, it includes at least the (input) packet or packets that is (or are) to be processed by the geometry processing (stage) that is being deferred. It may also, and in an embodiment does also, comprise any other data, such as state data, that is required for performing the geometry processing in question.

Thus, in an embodiment, when (where) geometry processing for a packet is to be (has been) deferred, the input packet or packets required for performing the deferred geometry processing are stored for later use, in an embodiment together with any state (e.g. shader configuration) needed for performing the geometry processing that is being deferred.

The input packets for the geometry processing that is deferred are in an embodiment stored appropriately in memory so that they can be retrieved when the geometry processing is performed at the rendering stage. In an embodiment, the storing of input packets in this manner and for this purpose is tracked, so that duplicated storing of input packets can (try to) be avoided.

Any state (e.g. shader configuration) information that is needed for performing the later geometry processing is in an embodiment stored in the binning data structures that are generated by the binning stage, for example, and in an embodiment, in association with appropriate entries for the packet in question in those binning data structures. Thus in an embodiment, the binning stage will store in a binning data structure a bounding box for a packet for which geometry processing has been deferred, together with state information (e.g. shader configuration information) for performing the geometry processing that has been deferred.

The determination of whether to defer geometry processing for a packet being processed by the geometry processing pipeline may be performed by any suitable and desired element and component of the graphics processor and of the graphics processing pipeline that is being executed.

This decision and determination could be made by the appropriate geometry processing pipeline stage, e.g. before the last geometry processing stage in the geometry processing pipeline being executed is started. (As discussed above, in an embodiment, there is appropriate information (metadata) indicating that a geometry processing stage is the last processing stage of the geometry processing pipeline being executed, such that the point at which a decision as to whether or not to defer that geometry processing stage needs to be made can be identified.)

In an embodiment, the binning stage of the graphics processing pipeline determines whether or not to defer geometry shading for a packet. In an embodiment this decision is performed by the binning stage before the binning stage includes the packet in (processes the packet in respect of) the binning data structures that the binning stage generates.

Thus, in an embodiment, when the last stage of the geometry processing pipeline being executed is reached (and before that geometry processing stage is performed), that is signalled to the binning stage, for the binning stage to then determine whether that final geometry processing stage should be deferred or not.

As discussed above, in an embodiment, the final stage of a geometry processing pipeline that is being executed is in an embodiment indicated as such, such that reaching that final stage for a packet can be identified and correspondingly signalled to the binning stage for this determination to take place.

In response to this, the binning stage will then determine whether the (final) stage of the geometry processing pipeline should be deferred for the packet.

When it is determined that the geometry processing should not be deferred, then the binning stage is in an embodiment operable to, and operates to, trigger the performance of the final geometry processing stage at that point. In this case therefore the packet will be subjected to the final geometry processing stage, and then that “completely” processed geometry packet will be, and is in an embodiment, returned to the binning stage for the binning stage to process that packet accordingly.

On the other hand, when the binning stage determines that the final geometry processing stage should be deferred for a packet, then the binning stage in an embodiment does not trigger (other than triggers) the performance of the final geometry processing stage at that point, and instead, in an embodiment, then processes the packet in its current form (i.e. as it is prior to the geometry processing that is to be deferred), to include the packet in a binning data structure or structures accordingly.

In this case therefore the packet that will be subjected to the binning process will be a packet for which the geometry processing has not been completed. This being the case, the binning stage in an embodiment processes that “incompletely geometry processed” packet so as to be able to include the packet in a binning data structure or structures accordingly, but does not perform any further processing for the packet that it would normally perform when processing a “completely geometry processed” packet.

Thus, in embodiments at least, the binning stage will receive from the geometry processing either a “completely” geometry processed packet for processing, or a packet for which the geometry processing has not been completed (for example, and in an embodiment, a packet for which all but the final geometry processing stage has been completed).

The binning stage should, and in an embodiment does, process the packets it receives for processing (whether “completely” geometry processed or not) to generate one or more data structures that can be used to determine whether (the respective) packets should be processed for respective rendering tiles. Thus, the binning stage in an embodiment generates one or more data structures that can be used to determine whether packets storing data for geometry to be processed should be processed for a rendering tile.

The “binning” data structures that are generated by the binning stage for this purpose can take any suitable and desired form. For example, they could comprise lists of packets to be processed for respective rendering tiles or sets of plural rendering tiles (which packet “tile” lists can then be used to determine which packets apply to a given tile).

In an embodiment, the (binning) data structures that can be used to determine whether packets storing data for a set of one or more primitives to be processed should be processed for a rendering tile comprise, in an embodiment hierarchies of, bounding boxes that can be used for that purpose. Most in an embodiment this comprises both bounding boxes for respective individual packets, together with bounding boxes for respective groups of plural packets (and, if desired, for respective groups of groups of plural packets, and so on, if desired).

In this case to determine packets that should be processed for a rendering tile, the rendering tile can, and will be, compared against the respective bounding boxes to identify those packets that apply to the tile.

The binning stage can generate the data structures to be used to determine which packets should be processed for a rendering tile in any suitable and desired manner. In an embodiment it uses an appropriate bounding box for a packet for this purpose. For example, in the case where the binning stage prepares lists of packets to be processed for tiles, a bounding box for a packet can be compared to the tiles' positions to identify which tile(s) the packet applies to. In the case where the binning data structure(s) comprises bounding boxes for packets, the bounding box for a packet can be included in those data structures appropriately.

The bounding box for a packet can be determined in any suitable and desired manner. In an embodiment this is done in the same way as (and as part of the same processing as) the determining of bounding boxes as discussed above for determining whether to defer geometry processing for a packet or not.

Thus in an embodiment, an appropriate bounding box for a packet is determined and used to determine whether to defer geometry processing for the packet, and, when it is determined to defer geometry processing for the packet, the so-determined bounding box is also used by the binning stage to process the packet for and include the packet in the binning data structure or structures that it is generating.

On the other hand, in the case where it is determined not to defer the geometry processing for a packet, the geometry processing for the packet is then completed, and the binning stage in an embodiment derives a bounding box for the "completed" packet to then use for processing the packet for and including the packet in the binning data structure or structures that the binning stage is generating.

(In the case where all the geometry processing for a packet has been completed (none of the geometry processing has been deferred), then the results of that geometry processing (which should, and in an embodiment does, comprise appropriately vertex shaded (transformed) positions for the vertices of the primitives that the packet relates to) can be, and is in an embodiment, used for determining the bounding box for the packet in question.)

Thus, in the case where a (the final) geometry processing stage is to be deferred for a packet, but the necessary information for determining a bounding box for the packet in its "current" form is available from the geometry processing that has been performed, then that information from the geometry processing that has been performed again can be, and is in an embodiment, used to determine a bounding box for the packet in question.

Alternatively, any necessary geometry processing, such as position/vertex shading, that is required to provide appropriately processed (transformed) vertex positions for vertices for primitives in the packet to allow a bounding box for the packet to be determined could be performed (and in one embodiment, that is the case). Thus, in this case, when the (final) stage of geometry processing is to be deferred for a packet, in an embodiment some geometry processing, such as position shading of vertices for primitives of the packet, is still performed, to allow a bounding box for the packet to be determined (but the complete geometry processing for the final stage of the geometry processing that is to be deferred will not be performed).

(With any results of any, e.g. vertex position shading, that is performed at this time to derive a bounding box for a packet in an embodiment being discarded (not retained) once the bounding box for the packet has been determined.)

In an embodiment, the bounding box for a packet is determined without (with other than) needing to perform (and performing) any position shading for vertices for primitives in the packet (where that information is not already available from the geometry processing that has been performed).

In one such embodiment, the bounding box is derived using information, e.g., and in an embodiment, from the application for which the graphics processing being performed (application-supplied information), for example, and in an embodiment, that defines a bounding volume for the packet and a way to transform the bounding volume to derive a bounding box for the packet. In this case therefore, there will be appropriate (meta) data associated with the packet, in an embodiment provided by the application, e.g. that defines a bounding volume for the packet and the way to transform the bounding volume to determine a bounding box for the packet. The binning stage will then use this information to determine a bounding box for the packet in question.

In an embodiment, the binning stage can also or instead, in an embodiment also, determine the bounding box for a packet from information that has been generated by a geometry processing stage or stage that has already been executed for the packet (and that precedes the geometry processing stage that is being deferred). This information can comprise any suitable and desired information that can allow a bounding box for a packet to be determined.

For example, in the case of a tessellation shader, the tessellation output may consist of barycentric coordinates (which will be expanded to vertices and primitives in a tessellation evaluation shader). In this case, the tessellation shader may be configured to provide the bounding volume in barycentric coordinates, with the tessellation evaluation shader being configured to transform those coordinates into screen space bounding box coordinates (which will then provide a bounding box for the packet in question).

Other arrangements would, of course, be possible.

In the case where geometry processing for a packet is not deferred in the manner of the technology described herein, then in an embodiment the binning stage operates to process the (finished) (geometry) packet output by the (complete) geometry processing, to generate a processed (primitive) packet therefrom (which is then the packet that is included in the appropriate data structure that can be used to determine whether packets should be processed for a rendering tile (and that is then processed by the rendering stage)).

The processing that the binning stage performs on a geometry packet in this regard can comprise any suitable and desired processing, but in an embodiment comprises at least performing appropriate culling operations for the primitives in the geometry packet, e.g., and in an embodiment to (try to) cull primitives based on the view frustum and/or the facing direction of the primitives.

The processing in an embodiment also comprises determining bounding boxes for the individual primitives in the (primitive) packet, and using those individual primitive bounding boxes to derive a bounding box for the (processed) primitive packet that the binning stage is generating, and to generate one or more binning data structures that can be used to determine whether the primitives should be processed for a rendering tile.

With regard to the latter processing, this may comprise generating appropriate lists of primitives to be processed for a rendering tile or sets of plural rendering tiles based on the primitive bounding boxes, and/or including the primitive bounding boxes in the bounding box-based binning data structures that the binning stage generates, as appropriate.

(Thus the packets storing data for geometry (e.g. for sets of primitives) that the binning stage generates binning data structures for (and including) may be (geometry) packets containing data for geometry to be processed generated by (some but not all of) the complete geometry processing pipeline, and/or there may be (primitive) packets that have been generated from "completely processed" geometry packets generated by the (complete) geometry processing pipeline by the binning stage.)

Once the binning stage has generated the necessary data structure or structures to be used to determine when the packets storing data for geometry to be processed should be processed for a rendering tile for a render output (e.g. draw call) being processed, then the rendering (rendering stage) for the output in question can be performed.

The rendering will be performed on a tile-by-tile basis (as the graphics processor is executing a tile-based graphics processing pipeline), and so accordingly, the rendering stage will, and in an embodiment does, use the binning data structures generated by the binning stage to identify packets to be processed for respective rendering tiles. Thus, for a (and each) rendering tile to be processed for generating the rendering output, the binning data structure(s) generated by the binning stage will be, and are in an embodiment, used to identify packets storing data for geometry to be processed for the rendering tile in question.

This can be done in any suitable and desired manner, and should, and in an embodiment does, depend upon the nature of the binning data structures that the binning stage has generated. For example, where the binning stage generates lists of packets to be processed for respective rendering tiles or sets of rendering tiles, those lists can be used to identify the packets to be processed for a rendering tile. Where the binning stage generates (hierarchies of) bounding boxes for packets, a rendering tile may be compared to the bounding boxes to determine the packets that need to be processed for the rendering tile.

(Correspondingly, the rendering stage in an embodiment should, and in an embodiment does, comprise an initial process of using the binning data structure(s) generated by the binning stage to identify packets to be processed for rendering tiles (which may comprise identifying packets to be processed for regions of the render output, as will be discussed further below). Correspondingly, references herein to deferring geometry processing to the rendering stage refer to deferring that geometry processing until after a binning data structure or structures has been used to identify packets to be processed for rendering tiles (render output regions). Similarly, the further geometry processing that is performed for a packet that has been determined as needing to be processed further for a rendering tile is correspondingly performed after (at least an initial) binning stage/process.)

When it is determined that a packet should be processed further for a rendering tile, then in the case where geometry processing for the packet in question has been deferred, any deferred geometry processing for the packet should be, and is in an embodiment, performed, before performing any further processing in relation to the packet for the rendering tile.

Thus, in an embodiment, when it is determined that a packet storing data for geometry to be processed needs to be processed further for a rendering tile, it is then determined whether further (deferred) geometry processing needs to be performed for the packet; and when it is determined that further geometry processing needs to be performed for the packet, the further (deferred) geometry processing for the packet is performed.

Thus, in an embodiment, the method of the technology described herein comprises (and the graphics processor comprises a processing circuit or circuits configured to):

for a packet storing data for geometry to be processed that has been determined as needing to be processed further for a rendering tile:

determining whether further (deferred) geometry processing needs to be performed for the packet; and when it is determined that further (deferred) geometry processing needs to be performed for the packet:

performing (the) further geometry processing for the packet.

Correspondingly, in an embodiment, the graphics processor comprises a processing circuit or circuits configured to:

determine, for a packet storing data for geometry to be processed that has been determined as needing to be processed further for a rendering tile, whether further (deferred) geometry processing needs to be performed for the packet; and when it is determined that further (deferred) geometry processing needs to be performed for the packet:

cause a processing circuit configured to trigger the performing of further geometry processing for a packet storing data for geometry to be processed after it has been determined that the packet needs to be processed further for a rendering tile to trigger the performing of further geometry processing for the packet (but when it is determined that further geometry processing does not need to be performed for the packet, not cause the processing circuit configured to trigger the performing of further geometry processing for a packet storing data for geometry to be processed after it has been determined that the packet needs to be processed further for a rendering tile to trigger the performing of further geometry processing for the packet).

It can be, and is in an embodiment, determined whether further geometry processing needs to be performed for a packet by identifying that there is a "deferred geometry processing" indicator that associated with a packet (as discussed above), e.g. stored for and with the packet in the binning data structure(s), to thereby determine that geometry processing has been deferred for the packet.

When it is determined that geometry processing for a packet has been deferred, then the geometry processing that was deferred for the packet will be performed at the rendering stage. The geometry processing that is performed at this stage should, and in an embodiment does, comprise (all of) the geometry processing that was deferred from the initial geometry processing (prior to the binning stage). Thus it may, and in an embodiment does, comprise performing the final geometry processing stage of the geometry processing pipeline being executed for the packet in question.

The deferred geometry processing that is performed at the rendering stage should, and in an embodiment does, use any input data, e.g. input packet or packets, and state (e.g. shader configuration) information that was stored for the packet for the deferred geometry processing being performed (as discussed above), so as to allow the deferred geometry processing to be performed appropriately.

The performance of the deferred geometry processing at the rendering stage can be triggered and controlled in any suitable and desired manner, and may be performed by any suitable and desired element and component of the graphics processor and of the graphics processing pipeline that is being executed.

In an embodiment, the binning stage triggers and controls the performance of any deferred geometry processing for a packet at the rendering stage (and in an embodiment in a corresponding manner to controlling and triggering the performance or not of the geometry processing that is (or is not) deferred as part of the (initial) geometry processing, as discussed above).

Thus, in an embodiment, for a packet for which it has been determined at the rendering stage that further (deferred) geometry processing needs to be performed, that is in an embodiment signalled to the binning stage, for the binning stage to then trigger the performance of the geometry processing that has been deferred for the packet in question (and as appropriate).

Once the deferred geometry processing for a packet has been completed, such that the packet has at that point been "completely" geometry processed, then in an embodiment, the binning stage operates to process the (now-finished) (geometry) packet from the (complete) geometry processing, to generate a processed (primitive) packet therefrom (as discussed above).

Most in an embodiment, as discussed above, the binning stage also determines at this stage bounding boxes for the individual primitives in the (primitive) packet, and updates the binning data structure or structures for the render output being generated accordingly (as discussed above, in the case where all of the geometry processing for a packet is performed prior to the binning stage).

The binning stage also in an embodiment correspondingly marks (sets) the packet as not (as no longer) having any geometry processing "deferred" for it in the updated binning structure(s), so that when the updated binning structure or structures are used, the packet will be seen as being "complete", and not needing further geometry processing to be performed for it (as that further geometry processing will now have been done). This will avoid, for example, further geometry processing for a packet being performed multiple times at the rendering stage.

As will be appreciated from the above, when performing deferred geometry processing for a packet at the rendering stage, the result of that processing (e.g. processed (primitive) packet and any updated binning data structure(s)), will need to be stored for use when rendering the tile in question.

The packet and other data that is generated at this point can be stored in any suitable and desired manner. In an embodiment, it is stored as and in a portion of memory that is intended to have a shorter lifetime than the (portion of) memory where completed primitive packets and binning data structures that are generated by the binning stage prior to the rendering stage are stored.

The Applicants have recognised in this regard that while fully (geometry) processed primitive packets that are generated prior to and as part of the binning stage may need to be retained as (intermediate) data for, e.g., the entirety, of the time while a render output is being generated in its entirety, any fully processed (primitive) packets that are generated by performing deferred geometry shading at the rendering stage may only be required when rendering the particular tile or tiles in question that the packet has been determined as applying to.

In this case therefore, any later, fully geometry processed primitive packets may be able to be discarded once the rendering tile or tiles to which they apply have been rendered, such that those packets can be, and are in an embodiment, discarded once they have been used. (Whereas any fully processed primitive packets that are generated as part of the initial geometry processing pipeline and binning stage should be retained until the render output itself has been completed, as it may not be possible to determine when those packets will no longer be needed during the rendering process for the render output in question.)

Thus, in an embodiment, any packets for which geometry processing and subsequent binning processing is performed at the rendering stage are in an embodiment stored in such a manner that they can, and will, where possible, be discarded (invalidated) prior to the completion of the generation of the render output in question (whereas packets for which the geometry processing was completed prior to the binning stage are in an embodiment stored in such a manner that they will be retained until (that they will only be discarded (invalidated) once) the rendering for the render output in question has been completed).

It would be possible to identify packets that need to be processed for a rendering tile and whether any of those packets have had any geometry processing deferred (and to then perform the deferred geometry processing) on a tile-by-tile basis (and in one embodiment that is what is done).

In an embodiment, the render output being generated is divided into a plurality of regions (by area), each region corresponding, for example, to a respective set of plural tiles, with the process then comprising (and the graphics processor being configured to) determining which packets need to be processed when rendering a respective region, whether any of those packets require further (deferred) geometry processing to be performed, and then performing any required further (deferred) geometry processing and further packet processing for packets, as required, and once any necessary deferred geometry processing and packet processing has been performed for packets that apply to the region, then performing the rendering/fragment processing for the region.

Thus in embodiments, the determining of whether a packet storing data for geometry as needing to be processed further for a rendering tile for the purpose of then (potentially) performing further geometry processing for the packet comprises:

determining that a packet storing data for geometry to be processed needs to be processed further for a region of the render output.

Correspondingly, the method of the technology described herein in an embodiment comprises for a packet storing data for geometry for processing that has been determined as needing to be processed further for a region of the render output:

(if necessary) performing further geometry processing for the packet; and using the result of the further geometry processing for processing the packet for the rendering tile.

Correspondingly, in an embodiment, the graphics processor comprises a processing circuit configured to trigger the performing of further geometry processing for a packet storing data for geometry to be processed after it has been determined that the packet needs to be processed further for a region of the render output.

Thus, a packet may be determined as needing to be processed further for a rendering tile for the purposes of (potentially) performing further geometry processing by determining that the packet needs to be processed further specifically with reference to a rendering tile, or with reference to a region of a render output, which does not necessarily correspond exactly to a rendering tile (e.g. may correspond to a plurality of rendering tiles).

Thus, in an embodiment, the method of the technology described herein comprises (and the graphics processor comprises a processing circuit or circuits configured to):

after the binning stage has generated the binning data structure or structures that can be used to determine whether packets storing data for geometry to be processed should be processed for a rendering tile, for each of a plurality of regions that the render output has been divided into:

using the binning data structure(s) to identify packets storing data for geometry to be processed that need to be processed for the region of the render output;

determining whether any of the packets identified as needing to be processed for the region of the render output require further geometry processing to be performed for them;

for any packets that have been identified as requiring further geometry processing to be performed, performing the further geometry processing; and rendering the region using the results of the further geometry processing when processing the packets for the region (in an embodiment once all the further geometry processing has been performed for all the packets identified as needing to be processed for the region).

As discussed above, the sub-division of a render output into regions for this purpose can be made in any suitable and desired manner. For example, the render output may simply be divided into a plurality of equally sized (equal area) regions.

In an embodiment, the division into regions for this purpose is based on an estimate of the amount of deferred geometry and other processing that will be required for a and each region. Most in an embodiment this is also or instead (and in an embodiment also) based on a known storage (memory) capacity for storing such deferred geometry data available to the graphics processor, with the region sizes then being set so as to try to avoid exceeding that storage capacity. The expected amount of deferred geometry and other processing for a region may be estimated, for example, by deriving from the binning data structures prepared by the binning stage, an indication (estimation), for example, of the number of packets for which geometry processing has been deferred for different regions of the render output.

In these arrangements, even when a region of the render output that is being considered is larger than an individual rendering tile, the region is in an embodiment still rendered as respective individual rendering tiles (on a rendering tile-by-rendering tile basis).

In these arrangements, any deferred geometry and packet processing that is performed for packets for a respective region of the render output is in an embodiment stored, as discussed above, in "shorter-lived" memory, that is in an embodiment discarded, after the region in question has been rendered.

Thus, in an embodiment, the method of the technology described herein comprises (and the graphics processor is correspondingly configured to):

when performing deferred geometry processing for a region of the render output, allocating a memory region or regions for storing the results of that deferred geometry processing, storing the results of the deferred processing for the region in the allocated memory region(s), and deallocating the allocated memory region(s) once rendering of the region has been completed.

Correspondingly, there is in an embodiment a different, separate memory region(s) allocated for storing the results of (non-deferred) geometry processing performed prior to the binning stage, which is (only) deallocated once all the rendering for the render output in question has been completed (once all the regions that the render output has been divided into have been rendered).

In other words, there are in an embodiment memory regions that are allocated and deallocated on a render output region-by-region basis, that are in an embodiment used to store data (e.g. packets) generated as a result of deferred (geometry) processing at the rendering stage, and another memory region or regions that are allocated and deallocated on a render output-by-render output basis, that are used to store data, such as packets, generated by geometry processing prior to the binning stage and by the binning stage.

The rendering/fragment processing that is performed for a tile can be any suitable and desired rendering/fragment processing that may be performed by a graphics processor and a graphics processing pipeline. Thus this may comprise, for example, rasterising primitives to fragments and fragment shading the fragments, and/or performing ray tracing processes, etc.

When performing the rendering, the result of any further geometry processing that was triggered at the rendering stage should be, and is in an embodiment, used when processing a packet for a rendering tile. This can comprise any suitable and desired processing and use of the results of the further geometry processing, as desired (and will, e.g., depend upon exactly what further geometry processing etc. has been performed for the packet in question). For example, it may result in modified and/or additional packets to be processed for a tile.

In an embodiment, it comprises using the result of the further geometry processing when processing the packet for the rendering tile to determine which primitives that the packet relates to apply to the rendering tile. (As discussed above, in an embodiment the result of the further geometry processing is in an embodiment used to update the binning data structures for the render output to allow it to be determined whether primitives stored in a packet to be processed should be processed for a rendering tile.)

Other arrangements would, of course, be possible.

In an embodiment, and where the graphics processor has the processing resources (e.g. processing (shader) cores) to support such operation, once the rendering/fragment processing for a region of a render output (e.g. draw call) has been started, the corresponding processing of a next region to be processed for the render output in question, and in particular the determination of whether there are any packets for which geometry processing has been deferred for the next region, and the triggering and the performance of that deferred geometry processing, is in an embodiment started and performed before the rendering/fragment processing has finished for the preceding region of the render output. In other words, in an embodiment, the determination of packets to be processed for a region, and the triggering and performance of any deferred geometry processing for packets for that region is in an embodiment started while rendering/fragment processing is being performed for a preceding region of the render output in question (or for a different render output). This can then facilitate more efficient processing of a given render output.

The above describes the main elements and operation of the graphics processor and graphics processing pipeline that are relevant to operation in the manner of the technology described herein.

As will be appreciated by those skilled in the art, the graphics processor can otherwise include and execute, and in an embodiment does include and execute, any one or one or more, and in an embodiment all, of the processing stages and circuits that graphics processors and graphics processing pipelines may (normally) include.

In an embodiment, the graphics processor comprises, and/or is in communication with a memory system, one or more memories, and/or memory devices that store the data described herein, and/or that store software for performing the processes described herein. The graphics processor may also be in communication with a host microprocessor, and/or with a display for displaying images based on the output of the graphics processor.

The output to be generated may comprise any output that can and is to be generated by the graphics processor and processing pipeline. Thus it may comprise, for example, a tile to be generated in a tile based graphics processing system, and/or a frame of output fragment data. The technology described herein can be used for all forms of output that a graphics processor and processing pipeline may be used to generate, such as frames for display, render-to-texture outputs, etc., In an embodiment, the output is an output frame, and in an embodiment an image.

In an embodiment, the various functions of the technology described herein are carried out on a single graphics processing platform that generates and outputs the (rendered) data that is, e.g., written to a frame buffer for a display device.

The various functions of the technology described herein can be carried out in any desired and suitable manner. For example, unless otherwise indicated, the functions of the technology described herein can be implemented in hardware or software, as desired. Thus, for example, unless otherwise indicated, the various functional elements, and stages, of the technology described herein may comprise a suitable processor or processors, controller or controllers, functional units, circuitry, circuits, processing logic, microprocessor arrangements, etc., that are configured to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry/circuits, etc., if desired.

Furthermore, unless otherwise indicated, any one or more or all of the processing stages of the technology described herein may be embodied as processing stage circuits, e.g., in the form of one or more fixed-function units (hardware) (processing circuits), and/or in the form of programmable processing circuits that can be programmed to perform the desired operation. Equally, any one or more of the processing stages and processing stage circuitry of the technology described herein may be provided as a separate circuit element to any one or more of the other processing stages or processing stage circuits, and/or any one or more or all of the processing stages and processing stage circuits may be at least partially formed of shared processing circuits.

Subject to any hardware necessary to carry out the specific functions discussed above, the graphics processor can otherwise include any one or more or all of the usual functional units, etc., that graphics processors include.

It will also be appreciated by those skilled in the art that all of the described embodiments of the technology described herein can, and, in an embodiment, do, include, as appropriate, any one or more or all of the features described herein.

The methods in accordance with the technology described herein may be implemented at least partially using software e.g. computer programs. It will thus be seen that the technology described herein may provide computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus, in a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CDROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrinkwrapped software, preloaded with a computer system, for example, on a system ROM or fixed disk, or distributed from a server or electronic bulletin board over a network, for example, the Internet or World Wide Web.

Embodiments of the technology described herein will now be described.

FIG. 1 shows an exemplary system on chip (SoC) graphics processing system 8 that comprises a host processor comprising a central processing unit (CPU) 1, a graphics processor (GPU) 2, a display processor 3, and a memory controller 5. As shown in FIG. 1, these units communicate via an interconnect 4 and have access to off-chip memory 6. In this system, the graphics processor 2 will render frames (images) to be displayed, and the display processor 3 will then provide the frames to a display panel 7 for display.

In use of this system, an application 9 such as a game, executing on one or more host processors (CPUs) 1 will, for example, require the display of frames on the display panel 7. To do this, the application will submit appropriate commands and data to a driver 10 for the graphics processor 2, e.g. that is executing on a CPU 1. The driver 10 will then generate appropriate commands and data to cause the graphics processor 2 to render appropriate frames for display and to store those frames in appropriate frame buffers, e.g. in the main memory 6. The display processor 3 will then read those frames into a buffer for the display from where they are then read out and displayed on the display panel 7 of the display.

In the present embodiment, the graphics processor 2 executes a graphics processing pipeline that processes graphics primitives, such as triangles, when generating an output, such as an image for display.

Figure 2:
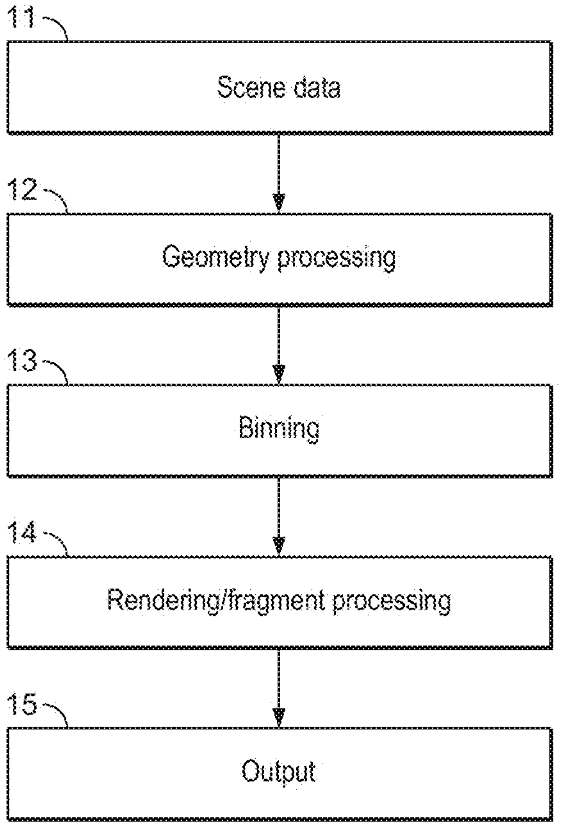
FIG. 2 shows an exemplary graphics processing pipeline.

FIG. 2 shows schematically the processing sequence of the graphics processing pipeline executed by the graphics processor 2 when generating an output in the present embodiments.

FIG. 2 shows the main elements and pipeline stages. As will be appreciated by those skilled in the art there may be other elements of the graphics processor and processing pipeline that are not illustrated in FIG. 2. It should also be noted here that FIG. 2 is only schematic, and that, for example, in practice the shown pipeline stages may share significant hardware circuits, even though they are shown schematically as separate stages in FIG. 2. It will also be appreciated that each of the stages, elements and units, etc., of the processing pipeline as shown in FIG. 2 may, unless otherwise indicated, be implemented as desired and will accordingly comprise, e.g., appropriate circuitry, circuits and/or processing logic, etc., for performing the necessary operation and functions.

As shown in FIG. 2, for an output to be generated, a set of, e.g. scene data 11, including, for example, and inter alia, a set of vertices (with each vertex having one or more attributes, such as positions, colours, etc., associated with it), a set of indices referencing the vertices in the set of vertices, and primitive configuration information indicating how the vertex indices are to be assembled into primitives for processing when generating the output, is provided to the graphics processor, for example, and in an embodiment, by storing it in the memory 6 from where it can then be read by the graphics processor 2.

This scene data may be provided by the application (and/or the driver in response to commands from the application) that requires the output to be generated, and may, for example, comprise the complete set of vertices, indices, etc., for the output in question, or, e.g., respective different sets of vertices, sets of indices, etc. e.g. for respective draw calls to be processed for the output in question. Other arrangements would, of course, be possible.

There is then a geometry processing stage or stages 12, which performs appropriate geometry processing of and for the scene data to generate the data that will then be required for rendering the output. This geometry processing 12 can comprise any suitable and desired geometry processing that may be performed as part of a graphics processing pipeline.

In the present embodiments, this geometry processing comprises at least performing vertex processing (vertex shading) of attributes for vertices to be used for primitives for the render output being generated. In particular, appropriate vertex position shading is performed to transform the positions for the vertices from the, e.g. "model" space in which they are initially defined, to the, e.g., "screen", space that the output is being generated in. In embodiments, the vertex shading also comprises generating and/or processing other, non-position attributes of vertices (varyings/varying shading). It would also be possible for some or all the varying shading to be deferred from the geometry processing and, for example, to be triggered at the binning or rendering stages instead, if desired.

As well as appropriate vertex shading, the geometry processing may comprise any other form of geometry processing that is desired, such as one or more of tessellation shading, transform feedback shading, mesh shading, or task shading. This geometry shading may also generate and/or process attributes for vertices, and/or it may process and generate attributes for primitives as well.

Once the desired geometry processing has been performed, there is then, in the present embodiments, as shown in FIG. 2, a binning/tiling stage 13. (It is assumed in this regard that the graphics processor 2 in the present embodiments is a tile-based graphics processor and so generates respective output tiles of an overall output (e.g. frame) to be generated separately to each other, with the set of tiles for the overall output then being appropriately combined to provide the final, overall output.)

The binning process operates to generate appropriate data structures for determining which primitives need to be processed for respective rendering tiles of the output being generated. For example, it may sort the primitives into appropriate primitive lists, which indicate the primitives to be processed for respective tiles or sets of tiles. Alternatively, it may generate other data structures, such as hierarchies of bounding boxes, that can then be used at the rendering/fragment processing stage to identify those primitives that need to be processed for a respective tile.

The binning/tiling process 13 may also cull primitives that are not visible (e.g. that fall outside the view frustum, and/or based on the facing direction of the primitives).

As part of the geometry processing and/or the binning/tiling operation the primitives to be processed will be "assembled". The primitives will, as discussed above, be assembled from a set of indices referencing vertices in a set of vertices for the render output processing being performed, based on primitive configuration information indicating how the vertex indices are to be assembled into primitives for processing when generating the render output.

Such primitive assembly may be performed as part of and at an appropriate stage of the geometry processing and/or as part of the binning/tiling processing, as desired. There may also, if desired, be two (or more) "primitive assembly" operations. For example, an initial primitive assembly operation could be performed to identify those vertices that will actually be used for the render output being generated before performing any vertex shading of the vertices, but with there then being a later primitive assembly stage that provides a sequence of assembled primitives for the binning/tiling stage.

Once the binning/tiling process has generated the necessary data structures for identifying the primitives to be processed for respective tiles of the render output, the primitives can then be and are then subjected to appropriate rendering/fragment processing 14. This operation is performed in the present embodiments on a tile-by-tile basis, using the data structures generated by the tiling/binning process 13 to identify those primitives that need to be processed for a respective tile.

The rendering/fragment processing can comprise any suitable and desired rendering and fragment processing operations that may be performed. Thus it may comprise, for example, first rasterising primitives to be processed for a tile to fragments, and then processing those fragments accordingly (e.g., and in an embodiment, by performing appropriate fragment shading of the fragments). The rendering/fragment processing may also or instead comprise performing ray tracing operations, such as performing the rendering by tracing rays for respective fragments representing respective sets of one or more sampling positions of the output being generated. Hybrid ray tracing operations would also be possible, if desired.

The output of the rendering/fragment processing (the rendered fragments) is written to a tile buffer (not shown). Once the processing for the tile in question has been completed, then the tile will be written to an output data array in memory 6, and the next tile processed, and so on, until the complete output data array 15 has been generated. The process will then move on to the next output data array (e.g. frame), and so on.

The output data array may typically be an image for a frame intended for display on a display device, such as a screen or printer, but may also, for example, comprise intermediate render data intended for use in later rendering passes (also known as a "render to texture" output), or for deferred rendering, or for hybrid ray tracing, etc.

Figure 3:
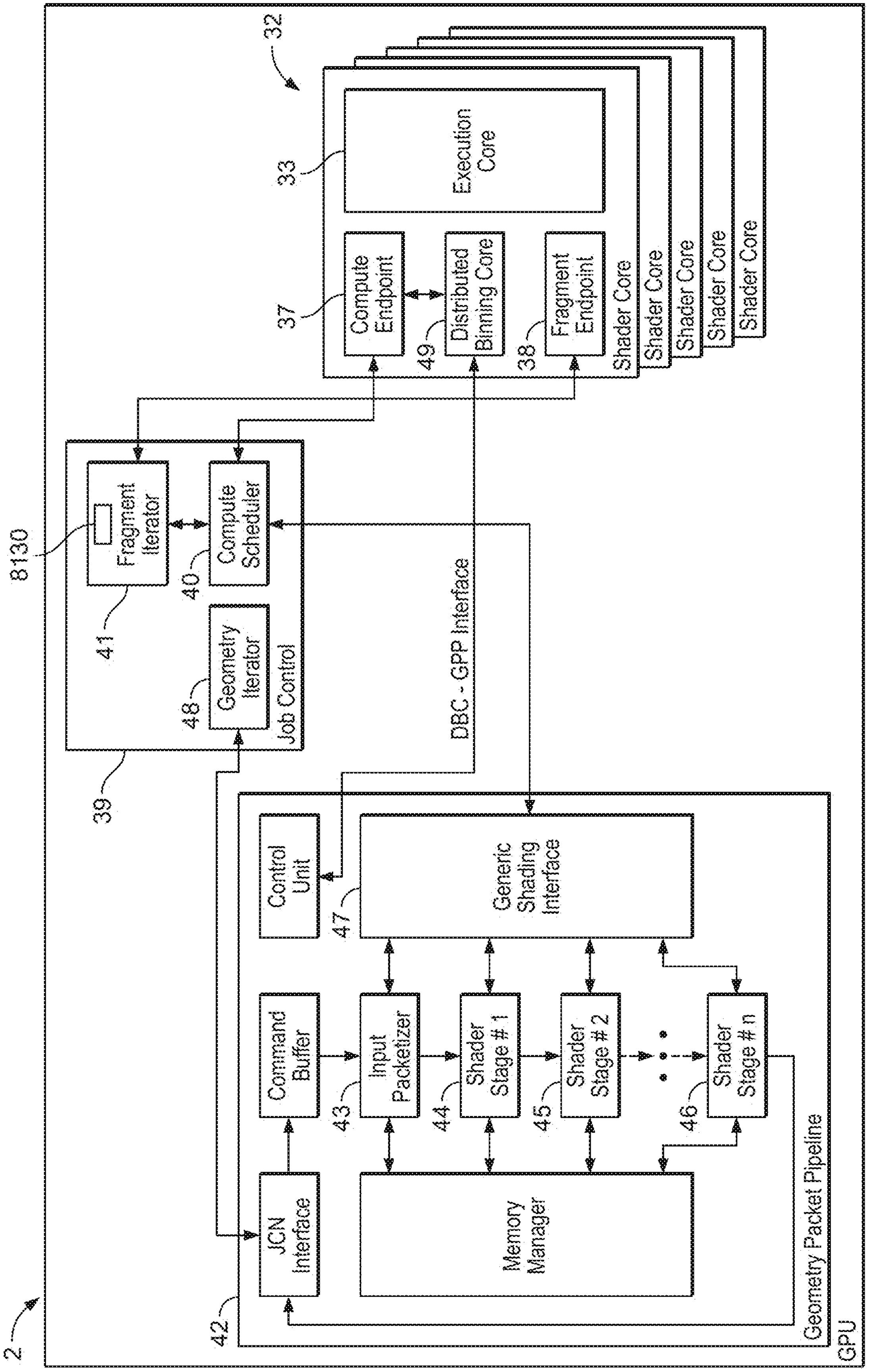
FIG. 3 shows schematically a graphics processor that may be operated in accordance with the technology described herein.

FIG. 3 shows an embodiment of a graphics processor (GPU) 2 that can execute a graphics processing pipeline of the form shown in FIG. 2, and that can be operated in the manner of the technology described herein.

As shown in FIG. 3, the graphics processor 2 comprises a plurality of processing (shader) cores 32 which are each operable to execute (shader) programs to perform processing operations. As shown in FIG. 3 each shader core 32 to facilitate this comprises a programmable execution unit (execution core) 33 that is operable to execute program instructions to perform processing operations.

In the present embodiments, the shader cores 32 are operable to execute both "compute" shader programs (to perform so-called compute shading) and fragment shader operations. Thus as shown in FIG. 3, each shader core 32 comprises an appropriate compute endpoint 37 and fragment endpoint 38 that act as the control interface for performing compute shading and fragment processing, respectively, and that will, for example, and in an embodiment, trigger the execution core 33 to execute the appropriate compute shading or fragment shading tasks, as required.

As shown in FIG. 3, the compute endpoint 37 and fragment endpoint 38 receive appropriate processing tasks from a job control unit 39 of the graphics processor 2, which job control unit 39 includes an appropriate compute scheduler 40 and fragment iterator 41 for distributing processing jobs that the job controller 39 receives as appropriate processing jobs to the shader cores 32.

As discussed above, when performing graphics processing, there will typically be an initial geometry processing stage that determines the vertex and other data that is necessary for generating the graphics processing output in question, which will then be followed by a rendering/fragment processing stage for processing (rendering) that geometry.

In the present embodiments, the geometry processing is performed, as shown in FIG. 3, by a geometry packet pipeline 42 of the graphics processor 2. This geometry packet pipeline is operable to trigger the performance of one or more "geometry" shader stages (which shader stages themselves will be executed by the shader cores 32, under the control of the geometry packet pipeline 42).

For example, as shown in FIG. 3, the geometry packet pipeline 42 comprises an input packetizer 43 that can trigger position shading and vertex shading by the shader cores 32. It also includes further shader stage circuits 44, 45, 46 that are operable to trigger compute shaders for performing geometry processing, such as task shaders, mesh shaders, tessellation shaders, etc. (which again will be executed by the shader cores 32).

As shown in FIG. 3, the geometry packet pipeline 42 has an appropriate interface 47 to the compute scheduler 40 of the job control unit 39, via which it can control and trigger the performance of appropriate geometry shading operations by the shader cores 32.

The overall operation of the geometry packet pipeline 42 is controlled by the job control unit 39 (by a geometry iterator 48 of the job control unit 39) which distributes the appropriate geometry processing jobs and tasks to the geometry packet pipeline 42.

The graphics processor 2 of FIG. 3 is configured to perform rendering in a tile-based manner (as discussed above). To facilitate this, as shown in FIG. 3, each shader core 32 also includes a distributed binning core 49 that is operable to generate appropriate data structures for determining which primitives need to be processed for respective rendering tiles of the output being generated.

In the present embodiments, the distributed binning cores 49 generate hierarchies of bounding boxes for primitives and primitive packets (that contain primitives to be rendered) (which are then used at the rendering/fragment processing stage to identify those primitives that need to be processed for a respective tile).

The distributed binning cores 49 may also cull primitives that are not visible (e.g. that fall outside the view frustum, and/or based on the facing direction of the primitives).

The distributed binning cores 49 can operate in any suitable and desired manner for this purpose.

The distributed binning cores 49 of the shader cores 32 may trigger vertex shading, such as varying shading, as part of their operation (e.g. where varying shading was not performed by the input packetizer as part of the input packetizer 43 operation).

In the present embodiments, the rendering/fragment processing is performed by executing appropriate fragment processing operations on a shader core 32 under the control of the fragment endpoint 38. To facilitate this, the fragment endpoint 38 of each shader core is operable to trigger appropriate fragment shader operation by a shader core.

As will be appreciated from the above, in operation of the present embodiments, the geometry packet pipeline 42 that performs the geometry processing will generate appropriate geometry data, such as (transformed) vertex positions, vertex varyings, and primitive attributes, which data will then be used, for example, by the binning/tiling processing and rendering/fragment processing of the later stages of the graphics processing pipeline.

In the present embodiments, the geometry packet pipeline 42 operates to generate respective geometry packets containing the data that it generates. In the present embodiments, those geometry packets are then processed by the distributed binning cores 49 to generate corresponding primitive packets, which primitive packets are then used by the fragment processing (fragment shaders) 52.

Thus, in the present embodiments, the geometry packet pipeline 42 will generate geometry packets that store attributes for vertices and primitives, which geometry packets will then be read and used by the distributed binning cores 49.

Correspondingly, the distributed binning cores 49 will generate appropriate primitive packets storing attributes for vertices and primitives, which primitive packets will then be read and used by the fragment processing 38.

Figure 4:
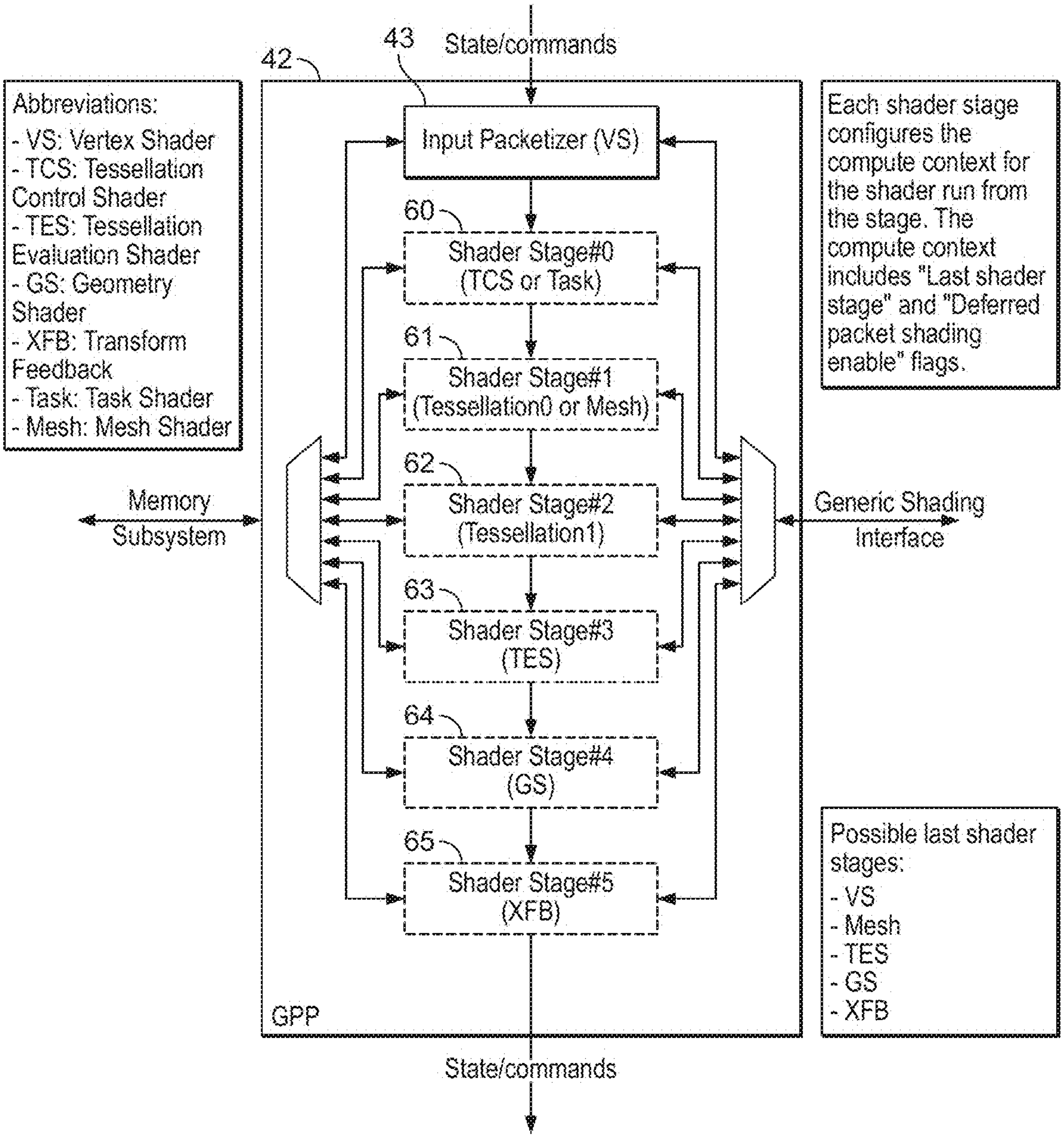
FIG. 4 shows the geometry processing pipeline of the graphics processor of FIG. 3 in more detail.

FIG. 4 shows the geometry packet pipeline 42 of the present embodiments in more detail.

As shown in FIG. 4, in the present embodiments the geometry packet pipeline 42 comprises (can trigger the execution of) (up to) six shader stages, an input packetizer 43 (that can trigger vertex shading (VS)); a next shader stage 60 that can trigger tessellation control shading or task shading; a next shader stage 61 that can trigger tessellation shading or mesh shading; a next shader stage 62 that can trigger further tessellation shading; a next shader stage 63 that can trigger tessellation evaluation shading; a next shader stage 64 that can trigger geometry shading; and a final shader stage 65, that can trigger transform feedback shading.

In the present embodiments, when executing the geometry packet pipeline for a render output (e.g. for a draw call), the various shader stages shown in FIG. 4 can be selectively enabled. In other words, not every execution of the geometry packet pipeline 42 will include all the shader stages shown in FIG. 4, but selective shader stages can be omitted from the geometry packet pipeline 42 that is being executed.

In any event, and irrespective of any preceding shader stages that are activated, in the present embodiments, the shader stages that can potentially be the last shader stage of any given geometry processing pipeline are the vertex shader (input packetizer 43); the mesh shader (shader stage 61), the tessellation evaluation shader (stage 63), the geometry shader (stage 64) and the transform feedback shader (stage 65).

One of these shader stages will always be the last shader stage in a given geometry packet pipeline that is being executed in the embodiments of the technology described herein. (Any shader stages that are omitted in the geometry packet pipeline actually being executed are disabled, so that packets will, in effect, simply pass through those stages without being processed.)

In operation, each shader stage of the geometry packet pipeline 42 will configure the compute context for the shader that is run from the stage in question. In the present embodiments, the compute context that is configured for a (and each) shader stage includes an indication of whether the shader stage in question is the last shader stage for the geometry processing pipeline being executed, and whether "deferred packet shading" has been enabled or not. In the present embodiments, the compute context for each shader stage includes appropriate flags that can be set to indicate this.

In the present embodiments, the first, input packetizer stage 43 of the geometry pipeline 42 of the present embodiments generates respective initial geometry packets storing data for sets of primitives to be processed for the render output being generated.

To do this, the input packetizer 43 assembles primitives using lists of vertex indices indicating vertices to be used to assemble primitives for the render output being generated based on appropriate primitive configuration information indicating how the lists of vertices should be assembled into primitives, and then assigns the assembled primitives to packets in order. In the present embodiments, a packet has a fixed capacity, e.g. an upper limit of vertices and/or primitives, and when the fixed capacity is reached, a new packet is started. Appropriate memory space for storing a packet is also allocated.

The (geometry) packets generated by the input packetizer 43 are then passed to the next (enabled) shader stage (if any) for processing, with that shader stage then performing appropriate processing of the packets that it receives and generating corresponding output packets, which are then passed on to the next shader stage of the geometry packet pipeline 42 (if any), and so on, until the final shading stage of the geometry packet pipeline being executed is reached (which as discussed above will be indicated as such).

In the present embodiments, when the last shader stage of the geometry packet pipeline being executed is reached for a packet, a packet shading request is sent for the last shader of the geometry packet pipeline to be executed for the packet, but rather than the last shader of the geometry packet pipeline being executed simply being executed on the shader cores 32 for the packet, the packet is instead first processed by a distributed binning core 49 of a shader core.

In particular, the "last" shader stage packet shading request for a packet is sent to the compute endpoint 37 of the shader core 32 in question which then signals the distributed binning core 49 accordingly.

The distributed binning core 49 then determines whether to defer the final shader stage of the geometry packet pipeline for the packet, or perform that last shader stage of the geometry packet pipeline being executed for the packet immediately.

Figure 5:
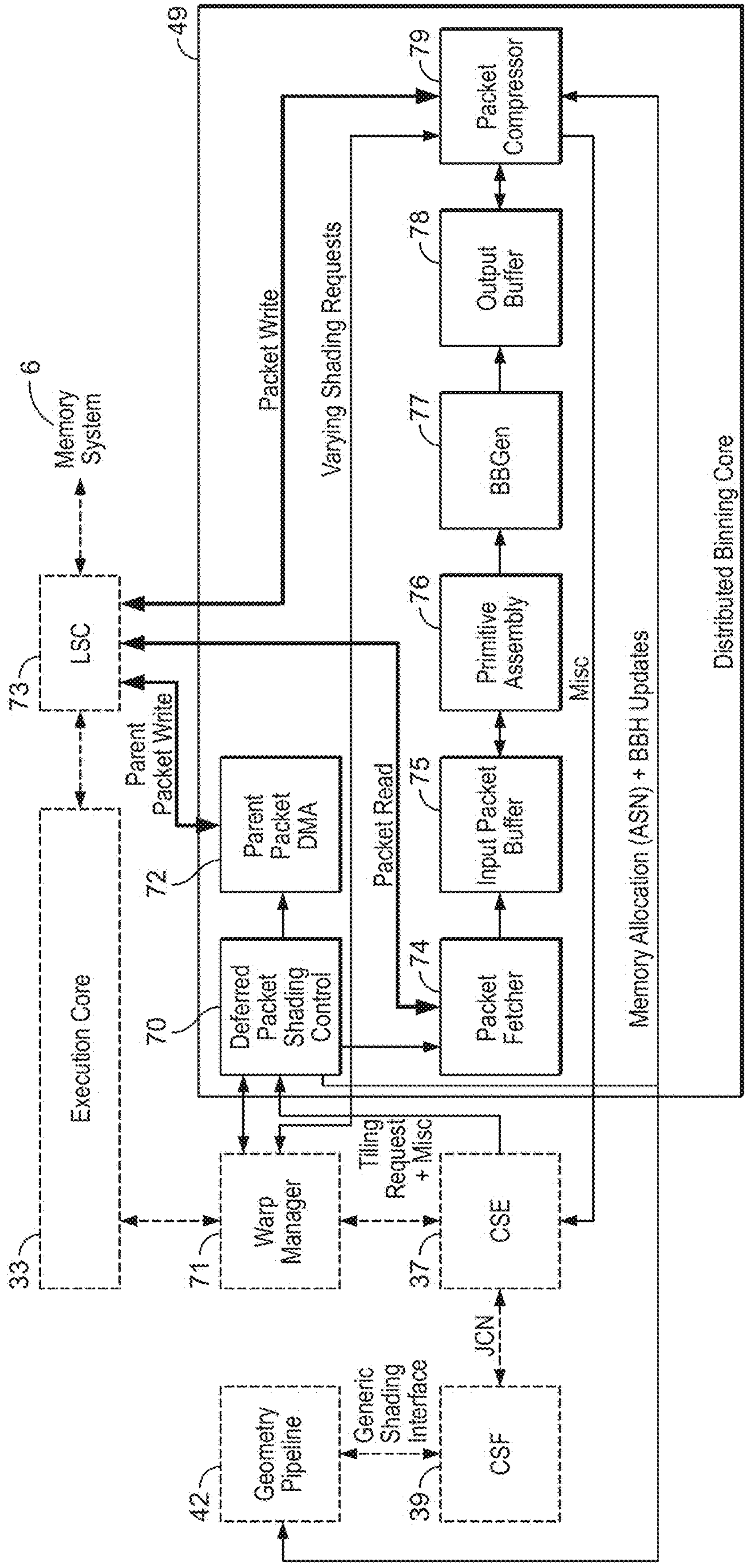
FIG. 5 shows a distributed binning core of the graphics processor of FIG. 3 in more detail.
Figure 6:
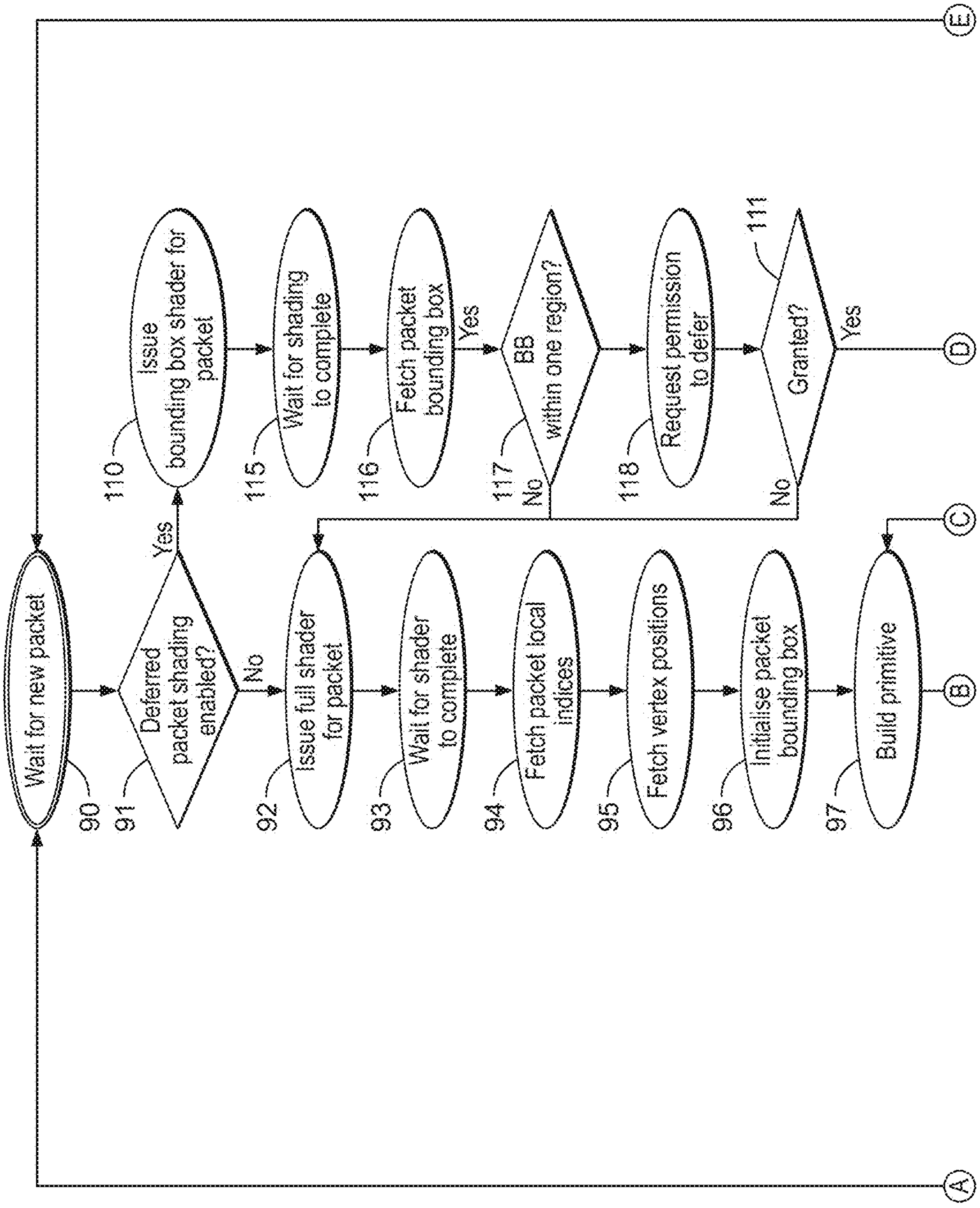
FIG. 6 is a flowchart showing the operation of a distributed binning core of the graphics processor in an embodiment.
Figure 6:
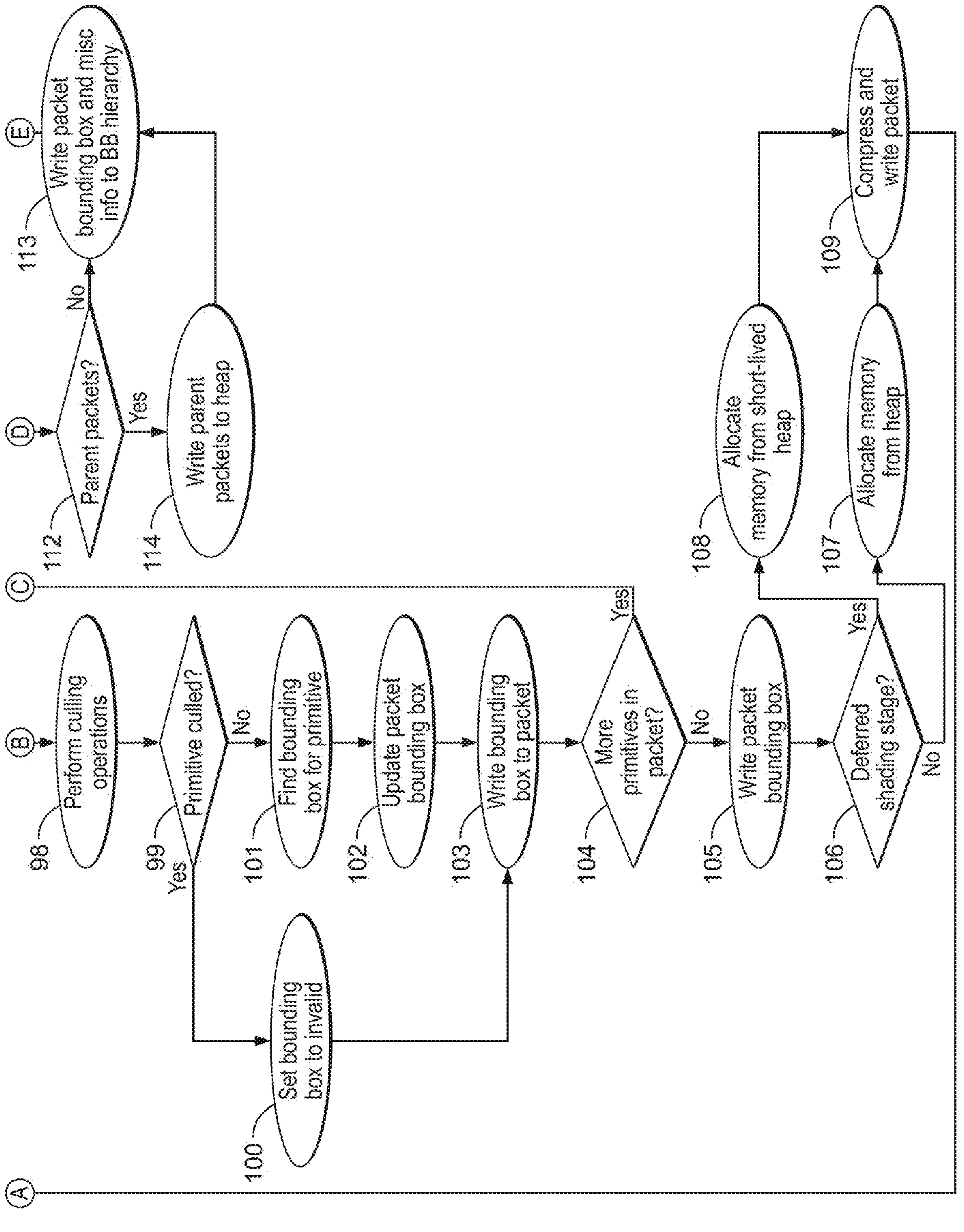

FIGS. 5 and 6 show the operation of a distributed binning core 49 in this regard in the present embodiments. FIG. 5 is a block view of a distributed binning core 49 showing elements of that core that are relevant to this operation. FIG. 6 is a flow chart showing the distributed binning core operation in the present embodiments.

As shown in FIG. 5, the distributed binning core includes a deferred packet shading control unit/circuit 70 that receives appropriate processing requests from the compute shader endpoint 37 when a last shader stage is to be executed for a packet.

As will be discussed further below, the deferred packet shading control 70 determines whether the last shading stage for the packet should be deferred or not, and then either triggers the shading for the packet, or defers that shading, accordingly. As shown in FIG. 5, to facilitate this, the deferred packet shading control unit 70 has an appropriate interface to a warp manager 71 for issuing shading processing to its associated execution core 33.

The deferred packet shading control unit 70 also controls a "parent packet" DMA unit 72 that is operable to write the "parent" packet (i.e. the geometry packet that is still to undergo its last shading stage) to memory (via, for example, a load store cache 73 of the shader core) in the case where the last shading stage is deferred (as if the last shading stage is deferred, the "parent" packet for that shading stage will be required for executing that shading stage later on in the processing (in a deferred manner)).

As shown in FIG. 5, the distributed binning core includes an appropriate packet processing pipeline 49, which is used to generate appropriate primitive packets for processing by the rendering/fragment processing from the geometry packets that it receives, and to also generate the appropriate data structures (which in the present embodiments are hierarchies of bounding boxes for packets) to allow the rendering/fragment processing to determine which packets need to be processed for a given rendering tile.

Thus as shown in FIG. 5, the distributed binning core packet processing pipeline comprises a packet fetcher 74 which is operable to fetch packets to be processed from the memory, and an input packet buffer 75 for buffering the packets while they are processed. A primitive assembly stage (circuit 76) is operable to assemble primitives in packets and, where appropriate, perform culling operations for the primitives. The assembled primitives (that are not culled) are then passed to a bounding box generation stage/circuit 77, with the processed primitives, etc., then being stored in an output buffer 78 until the relevant primitive packet is completed (at which point the packet will be compressed 79 and then written out to memory).

As shown in FIG. 5, the distributed binning core can also trigger vertex varying shading for vertices in a packet, if required, for example where that has not been performed as part of the geometry packet pipeline execution.

FIG. 6 shows the operation of the distributed binning core 49 when a packet shading request for the last shader of the geometry packet pipeline being executed is received for a packet.

As shown in FIG. 6, when such a shading request for a packet is received (step 90), it will first be determined whether deferred packet shading has been enabled (step 91).

If deferred packet shading has not been enabled then the last shading stage of the geometry packet pipeline being executed will be performed immediately (triggered by the deferred packet shading control 70 of the distributed binning core).

Thus in this case, the full shader (the last shading stage for the geometry packet pipeline) will be issued and executed (step 92) for the packet in question. Then, once that shading has been completed (step 93), the distributing binning core will process the "finished" geometry packet to derive a bounding box for the packet and for the primitives in the packet and to cull any primitives in the packet that can be culled, etc.

For this processing, as shown in FIG. 6, first the indices for the vertices in the (completely geometry processed) geometry packet will be fetched (step 94). The vertex positions for the vertices in the packet will correspondingly be fetched (step 95), and a bounding box for the packet initialised (step 96).

The process will then build each primitive in the packet (step 97) in turn, and determine if the primitive can be culled (step 98). If a primitive is culled (step 99), then the bounding box for the primitive is set to be invalid (step 100) (to indicate that the primitive has been culled), and that (invalid) bounding box is written to the primitive packet accordingly (step 103).

On the other hand, if the primitive is not culled (step 99), then a bounding box for the primitive is determined (step 101). The bounding box for the packet is updated based on the primitive bounding box (step 102), and the bounding box for the primitive is written to the packet (step 103).

If there are more primitives in the packet, then the process is repeated until all the primitives for the packet have been processed (step 104).

Once all the primitives in the packet have been processed, then the overall bounding box for the packet is written to the packet bounding box hierarchy, as appropriate (step 105). The packet itself is then compressed and written out to memory (step 109).

As shown in FIG. 6, and as will be discussed in more detail below, in the case where the last stage of geometry shading for a packet is not being deferred (so is being performed immediately) then the packet is compressed and written to a "long-term" heap in memory (steps 106 and 107).

As shown in FIG. 6, in the case where deferred packet shading is enabled at step 91, then the process first determines a bounding box for the packet in question.

This packet bounding box can be determined in any suitable and desired manner.

This may, as discussed above, be based on and use information provided by the application that is requesting the graphics processing, and/or use appropriate position information for the packet from preceding geometry processing stages that have been performed for the packet, and/or be determined by executing an appropriate position shading (bounding box shader) for the packet that determines a bounding box for the packet (but does not otherwise perform any geometry processing, e.g. that is to be deferred for the packet).

In the case where the bounding box for a packet is then determined by running a bounding box shader for the packet (as shown in FIG. 6), the distributed binning core will issue the bounding box shader (step 110) and wait for the shading to be complete (step 115), and then fetch the packet bounding box that has been generated as a result of the bounding box shader (step 116).

Thus, if necessary, the deferred packet shading control triggers a process to appropriately generate a bounding box for a packet (and then fetches the bounding box for the packet). Alternatively, where the bounding box for the packet is already available, it will simply fetch the bounding box for the packet.

It is then determined whether the bounding box for the packet falls entirely within a single region of a plurality of regions that the render output has been divided into for the purposes of handling deferred packet shading (as discussed herein) (step 117).

As shown in FIG. 6, in the case that it is determined that the bounding box for the packet does not fall entirely within a single region at step 117, then the full shader is issued for the packet at step 92 and the process discussed above is followed for the packet.

On the other hand, in the case where the bounding box for a packet does fall entirely within one region that the render output has been divided into for this purpose, the deferred packet shading control 70 will then determine whether to defer the final geometry packet pipeline shading stage for the packet or not (steps 118 and 111).

In the present embodiment, this decision is based on the (estimated) amount of data that would be generated and accordingly need to be stored at the rendering stage when performing the deferred geometry processing. In particular, a threshold maximum amount of data capacity for performing deferred geometry processing for a region of the render output is set, in terms of a permitted maximum number of packets for which geometry processing can be deferred for a given region of a render output.

A count of how many packets that have already been deferred for each region of the render output is maintained for each region of the render output, and compared to the permitted maximum number of deferred packets for a region. Once the maximum permitted number of deferred packets for a region has been reached for a region, then no more packets are deferred for the render output region in question.

Other arrangements would, of course, be possible.

As shown in FIG. 6, in the case that it is decided not to defer the final geometry packet pipeline shading stage for the packet at step 111, then the full shader is issued for the packet at step 92 and the process discussed above is followed for the packet.

On the other hand, when it is decided to defer the final geometry packet pipeline shading stage for the packet, it is then determined whether the packet whose processing is being deferred has any relevant parent packets that would be needed when performing the deferred processing (step 112). If so, the deferred packet shading control 70 causes the required parent packets to be written appropriately to memory (step 113).

As shown in FIG. 6, the distributed binning core operation will then write the packet bounding box and any other information (e.g. state) required for performing the deferred packet shading at a later time into the bounding box hierarchy structure that it is generating for the render output in question (step 114).

The process then waits for the next packet to be processed (step 90), and so on.

Once all the packets for a render output (e.g. draw call) being processed have reached the last stage of the geometry processing pipeline being executed and correspondingly being processed by a distributed binning core in the manner illustrated in FIG. 6, then the distributed binning core(s) will have generated, between them, an appropriate binning data structure or structures that can be used to determine which packets for the render output should be processed for respective rendering tiles of the render output.

In the present embodiments, the binning data structures generated by the distributed binning cores comprise appropriate bounding box hierarchies, against which respective rendering tiles can be tested to determine whether a packet should be processed for the rendering tile or not.

Figure 16:
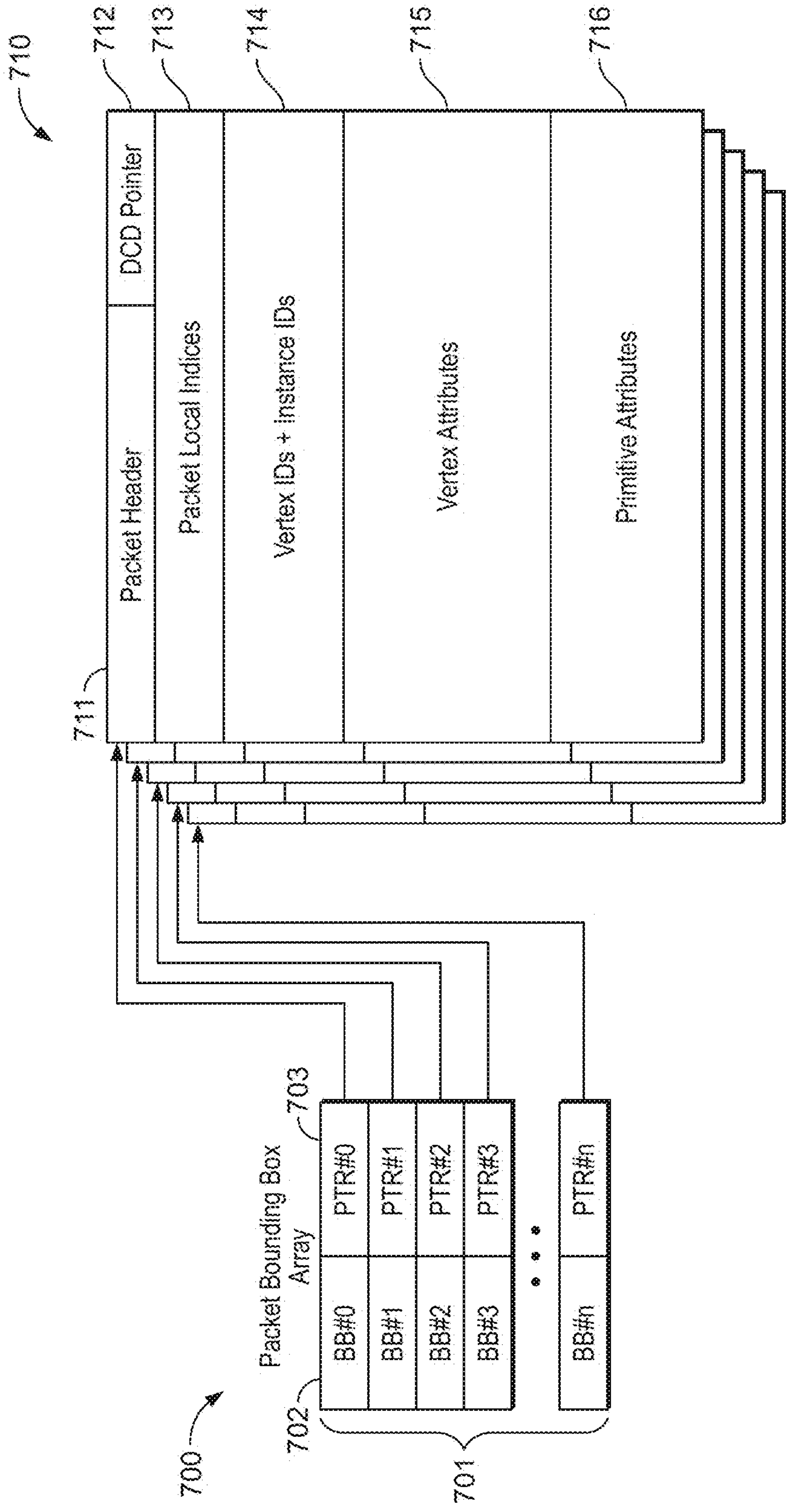
FIGS. 16 and 17 show exemplary binning data structures.
Figure 17:
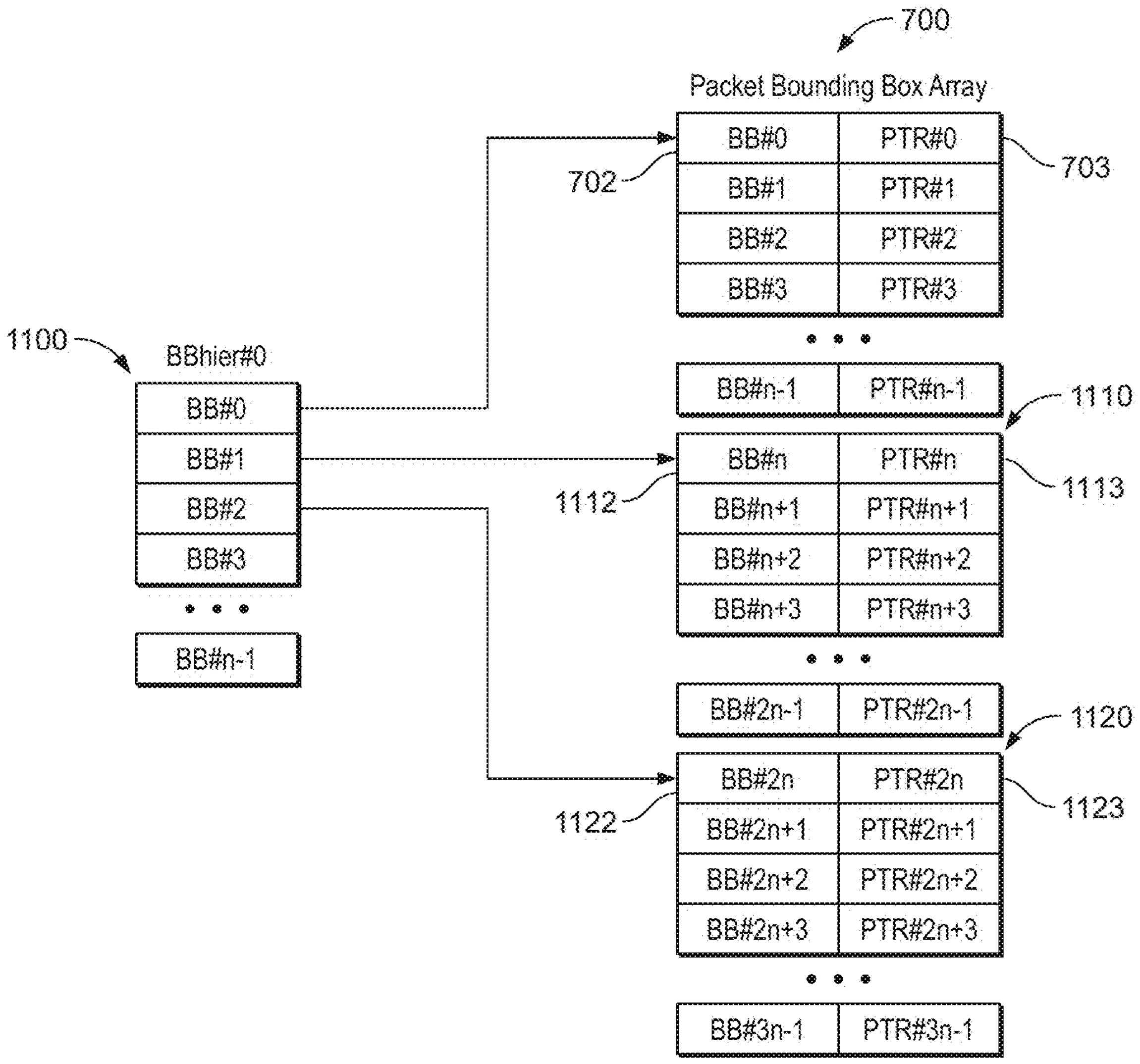

FIGS. 16 and 17, show, by way of example, a bounding box hierarchy binning data structure that may be generated in the present embodiments, in the case where all the geometry processing for all of the packets for the render output in question is (fully) completed prior to the binning stage (prior to the binning data structures being generated).

As shown in FIG. 16, the lowest level of the bounding box hierarchy comprises a packet bounding box array 700 that includes a number of entries 701 that each include a respective pointer 703 pointing to the respective packet 710 in memory, and a bounding box (bounding box information) 702 for the packet in question.

FIG. 16 also shows the memory layout and content for an exemplary packet 710 that may have been generated. As illustrated in FIG. 16, in the present embodiments, each packet 710 may include header information 711 that includes a pointer to the draw call descriptor (DCD) 712 for the draw call that the packet represents. Each packet 710 further includes body information comprising identifiers 714 for the vertices that the packet contains, and indices 713 that reference the vertices to define the primitives that the packet contains. Each packet 710 further includes vertex attribute data 715 for the vertices that the packet contains, and primitive attribute data 716 for the primitives that the packet contains.

A packet 710 may also comprise respective primitive bounding boxes for primitives contained within the packet (where they have been generated by the binning process).

Other arrangements of packet would, of course, be possible.

As shown in FIG. 17 one or more further bounding box hierarchy levels are also generated.

As illustrated in FIG. 17, a bounding box hierarchy array 1100 may be maintained, with each entry of the array comprising a pointer pointing to an array defining bounding boxes for a respective level of the bounding box hierarchy. As illustrated in FIG. 17, in this embodiment, the first entry of the bounding box hierarchy array 1100 points to the lowest level packet array 700 shown in FIG. 16.

A higher level of the bounding box hierarchy may be generated by iterating through the packet array 700 and generating from the packet bounding boxes 702, bounding boxes for groups of, e.g. two, four, eight (or another number), packets. As illustrated in FIG. 17, these (larger) bounding boxes may be stored in entries of higher-level array 1110, wherein each entry of the array 1110 comprises a respective, "higher level" bounding box 1112, and pointers 1113 pointing to the packet array 700 entries for the packet bounding boxes from which the "higher level" bounding box was generated.

Further levels of the bounding box hierarchy may be generated in an analogous manner. For example, FIG. 17 shows a higher-still level of the bounding box hierarchy generated by iterating through array 1110 and generating from the bounding boxes 1112, larger bounding boxes, which are stored in entries of array 1120, wherein each entry of the array 1120 comprises a respective, higher level bounding box 1122, and pointers 1123 pointing to the corresponding next lower level array 1110 entries. Further levels of the bounding box hierarchy may be generated up to a "highest" level which may comprise a single bounding box that encompasses all primitives of all packets, e.g. for the draw call/render output in question.

Figure 7:
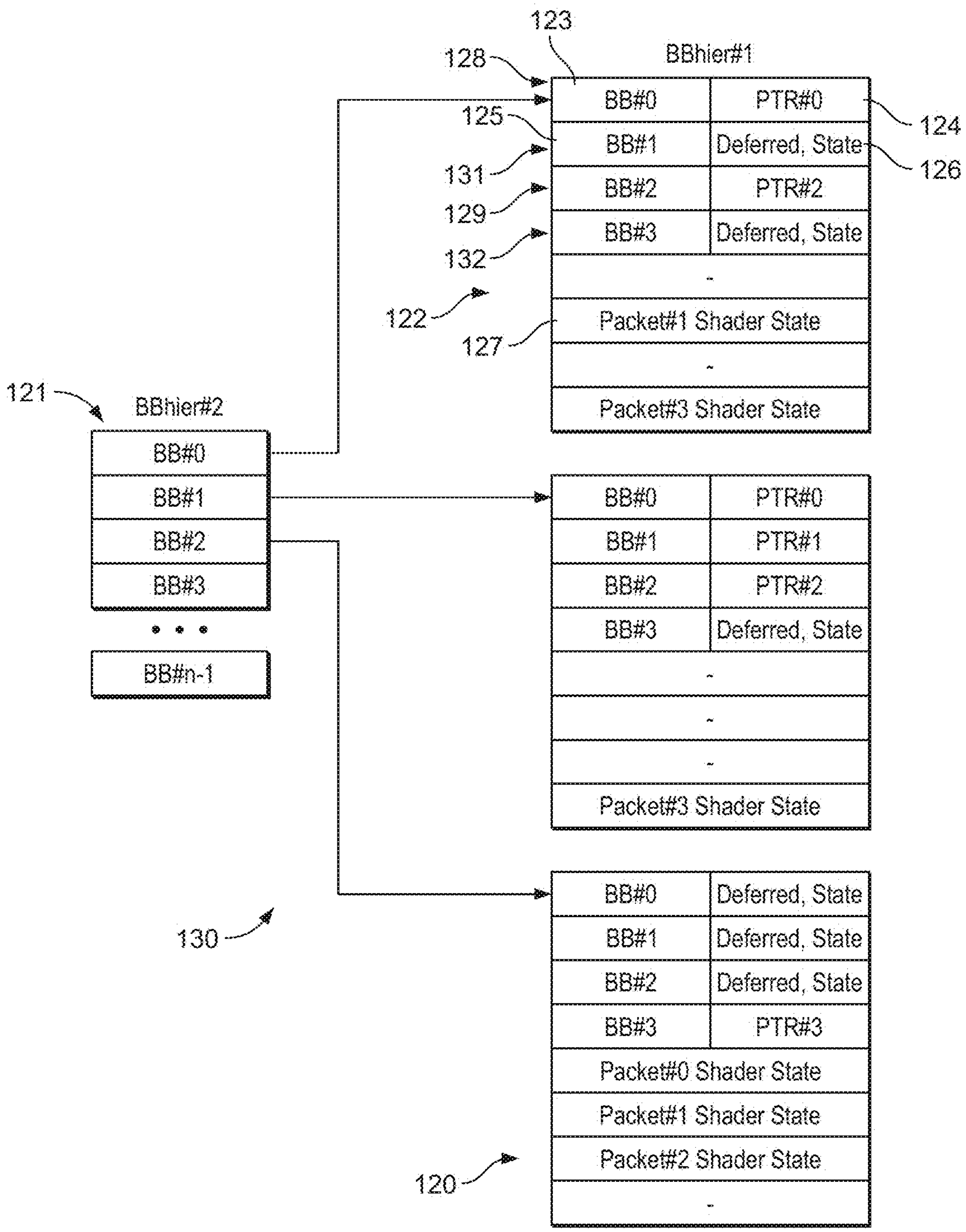
FIG. 7 shows an embodiment of a binning data structure.

FIG. 7 shows a corresponding binning data structure 130 in the form of a bounding box hierarchy for use to determine which packets should be processed for respective rendering tiles that is generated by the distributing binning cores 49 in the present embodiments in the case where the last geometry shader stage has been deferred for some packets (so including "primitive" packets for which the geometry packet pipeline has been fully executed, and "geometry" packets for which the last stage of the geometry packet pipeline has been deferred).

As shown in FIG. 7, the bounding box hierarchy in this example includes two levels, a lower level 120 that stores bounding boxes for respective individual primitive packets, and a higher level 121 that stores bounding boxes for respective groups of primitive packets.

Thus, when using this data structure to identify primitive packets that should be processed for a rendering tile, the tile will first be tested against the higher level bounding boxes 121 to determine respective groups of primitives that (potentially) need to be processed for the tile. Then the tile will be tested against the respective individual packet bounding boxes in the appropriate lower level 120 data structure to identify those primitive packets that should be processed for the tile.

As shown in FIG. 7, the lower level bounding box hierarchy 120 stores in the case of a primitive packet for which the last stage of the geometry packet pipeline was not deferred, a bounding box 123 for the primitive packet, and a pointer 124 to where the primitive packet is stored in memory.

On the other hand, for a primitive packet whose last stage in the geometry packet pipeline was deferred, the lower level 120 of the bounding box hierarchy instead stores a bounding box 125 for the primitive packet, together with an indication 126 that the last stage of the geometry packet pipeline for that packet has been deferred, and any appropriate state, etc., 126, 127 that is required for performing the deferred shading.

Thus, as shown in FIG. 7, for a first group of four primitive packets 122, for the first and third primitive packets 128, 129 in that group, for which all of the geometry packet pipeline shading has been completed, an appropriate bounding box and a pointer to the packet in memory is stored in the binning data structure 130.

On the other hand, the second and fourth primitive packets 131, 132 have had the last stage of the geometry packet pipeline shading deferred, and so for those packets, a bounding box and an indication that the shading has been deferred, together with the appropriate shader state for performing the deferred shading, is stored.

Once the necessary binning data structures for the render output (e.g. draw call) being processed have been generated by the distributed binning cores, then the rendering/fragment processing of the render output in question can be performed.

In the present embodiments, the rendering/fragment processing is triggered and controlled by the fragment iterator 41 issuing appropriate fragment shading (rendering) tasks to the fragment endpoints 38 of the shader cores, with the fragment endpoints then triggering appropriate fragment shading etc., on the execution cores, accordingly.

In the present embodiments, the triggering and control of the rendering/fragment shading by the fragment iterator is also operable to determine whether any geometry shading has been deferred for packets to be processed for tiles, and to, if so, trigger the performance of the deferred geometry processing for a packet, before the rendering/fragment processing for a tile using the packet is performed.

To facilitate this, in the present embodiments, the fragment iterator includes a deferred shading control unit (circuit) 8130, that receives appropriate commands (run_fragment) commands to perform rendering/fragment processing for a render output, and which in response to those commands, determines whether deferred geometry shading has been enabled, and if so, then determines whether any deferred geometry shading for packets for a render output needs to be performed before rendering/fragment shading is performed.

Figure 8:
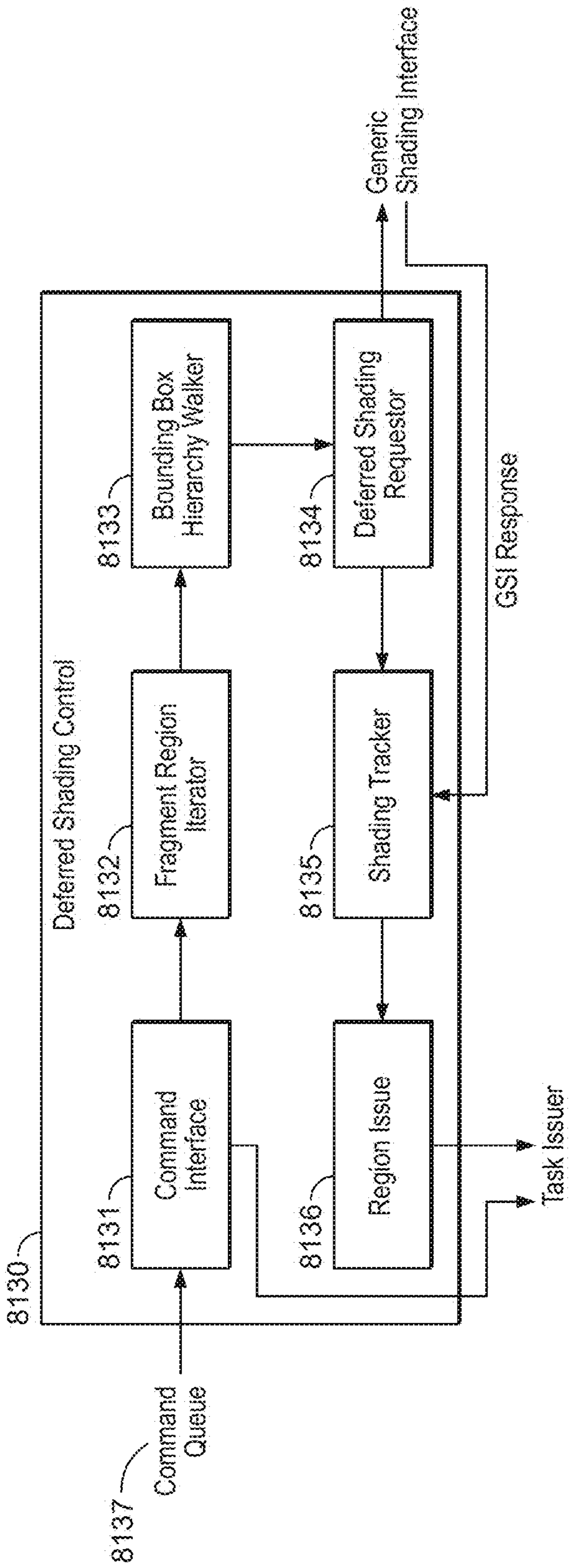
FIG. 8 shows a deferred shading control unit in an embodiment.
Figure 9:
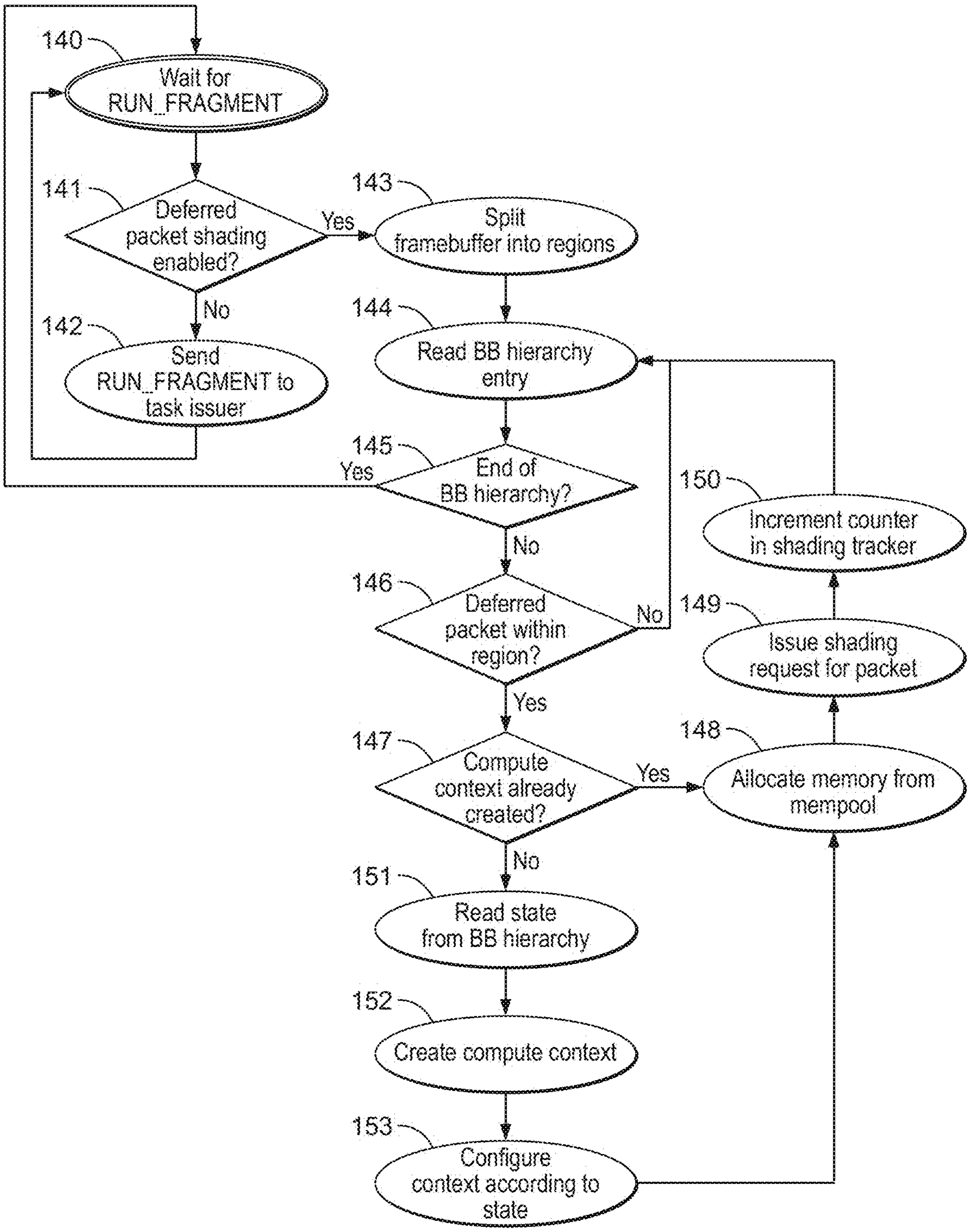
FIGS. 9 and 10 are flowcharts showing the operation of the deferred shading control unit in an embodiment.
Figure 10:
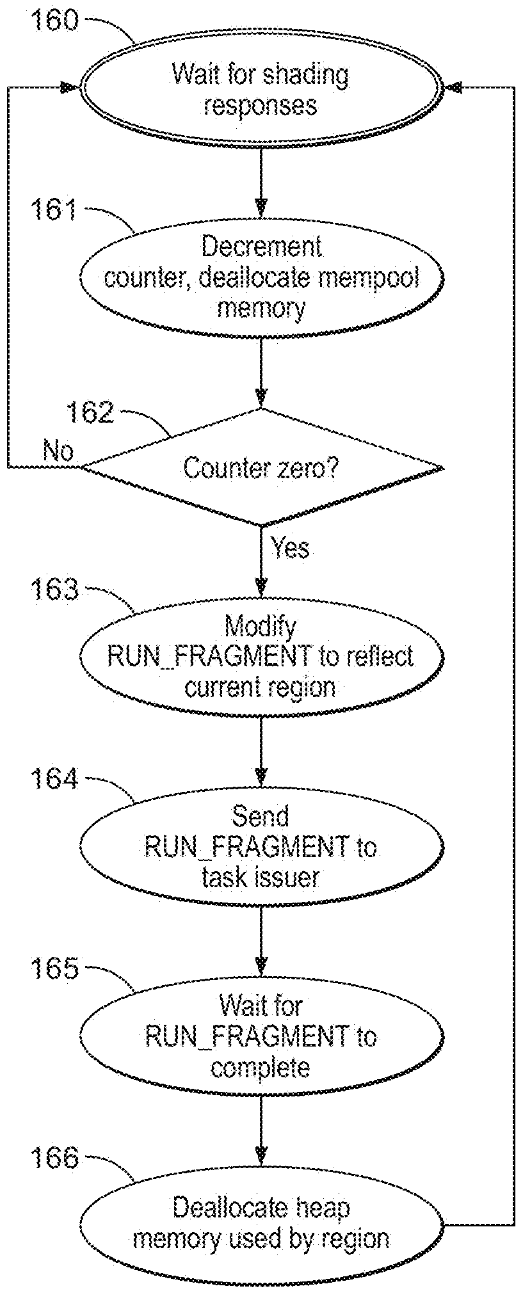

FIG. 8 shows the deferred shading control unit 8130 of the present embodiments in more detail. FIGS. 9 and 10 are corresponding flowcharts showing the operation of the deferred shading control unit of the present embodiments.

As shown in FIG. 8, the deferred shading control unit 8130 includes a command interface 8131 that receives appropriate rendering/fragment shading commands from a command queue 8137.

When the command interface 8131 receives a run_fragment command (thereby indicating that fragment shading for a render output should be performed) (step 140, FIG. 9), the command interface 8131 (FIG. 8) first determines whether deferred packet (geometry) shading has been enabled (step 141, FIG. 9).

In the event that deferred packet shading has not been enabled, then the command interface simply sends the run_fragment command directly to a task issuer that generates the appropriate tasks for sending to the fragment endpoints 38 of the shader cores 32 to perform the necessary fragment shading to generate the render output (step 142, FIG. 9).

On the other hand, in the event that deferred geometry shading for packets has been enabled, then the command interface 131 signals a fragment iterator 8132 (FIG. 8) to that effect. The fragment region iterator 8132 divides the render output into respective regions (areas) for processing (step 143, FIG. 9).

In particular, the fragment region iterator 8132 operates to scan through the binning data structures (the bounding box hierarchy) for the render output being generated, to determine information of how the rendering (fragment shading) can be performed for the render output in question with the aim of avoiding needing to store any data generated when performing deferred geometry processing for packets for a region to external memory. Thus the fragment region iterator 8132 attempts to divide the render output (frame) into smaller regions, such that the (estimated/predicted) amount of deferred geometry shading data will not exceed the (local) storage capacity of the graphics processor. (This said, the overall process does still include some mechanism for allowing data to be "spilled" to external memory if required.)

Each region may comprise a single rendering tile, but in an embodiment comprises plural (contiguous) rendering tiles.

Once the render output (frame) region partitioning is decided, the fragment region iterator 8132 selects a region for processing and signals a bounding box hierarchy walker 8133 to walk the binning bounding box hierarchy to identify any packets for the region for which the geometry processing has been deferred.

The bounding box hierarchy walker (walking circuit) 8133 (FIG. 8) traverses the bounding box hierarchy binning data structure generated by the distributed binning cores to determine those geometry/primitive packets that apply to the render output region in question and whether any of those packets have had their geometry processing deferred (steps 144, 145 and 146 in FIG. 9).

When a packet applying to a region for which the geometry processing has been deferred is identified at step 146, the appropriate geometry processing for that packet is triggered by a deferred shading requester circuit 8134 (see FIG. 8) of the deferred shading control unit 8130. (For any packets applying to the region for which geometry processing has been deferred, the appropriate deferred shading operation is triggered (issued) by the deferred shading requester 134.)

When deferred geometry processing for the packet is to be performed, as shown in FIG. 9 it is first determined whether the appropriate compute shading context has already been created (step 147).

If so, an appropriate memory allocation is allocated for the result of the geometry processing of the packet (step 148), the appropriate geometry shading request for the packet is issued (step 149) and a counter in a geometry processing shading tracker 8135 is incremented (step 150) (this counter is used to track and determine when all the packets within the region being considered have had their deferred geometry processing completed).

In the case where the compute context for the deferred geometry shading has not already been created (step 147), then the appropriate compute shading state is read from the bounding box hierarchy binning data structure (step 151), the appropriate compute shading context is created (step 152), and configured according to the read state for the packet in question (step 153).

Then, again, appropriate memory is allocated, a shading request for the packet is issued, and the shading tracker counter is incremented (steps 148, 149 and 150).

In the present embodiments, the deferred geometry shading for a packet is triggered and controlled by sending a shading request for the packet to the distributed binning control of a shader core, for the distributed binning core of the shader core to then trigger the deferred geometry shading for the packet in question and then generate an appropriate processed packet and updated binning data structure (bounding box hierarchy) for the processed (and shaded) packet. This operation is performed in the manner discussed above with reference to FIG. 6 (in the case where deferred packet shading is not enabled at step 91).

Thus, in this case, when the packet for which deferred geometry shading is to be performed is sent to a distributed binning core at the rendering stage, the distributed binning core will first issue the deferred geometry shading for the packet (step 92), and then when that shading is complete (step 93) process the packet in the manner discussed above with reference to FIG. 6 to generate the appropriate primitive packet (steps 94-105) and update the corresponding binning data structure (bounding box hierarchy) accordingly.

The binning stage also in an embodiment correspondingly sets the packet as not (no longer) having any geometry processing "deferred" for it in the updated binning structure, so that when the updated binning structure is used, the packet will be seen as being "complete", and not needing further geometry processing to be performed for it (as that further geometry processing will now have been done).

As shown in FIG. 6, in this case, as the processing is being performed at the deferred shading point (step 106), the processed packet that has been generated by the distributed binning core after the deferred shading has been performed is stored in a "short-lived" heap in memory (steps 108 and 109) (rather than being stored in a longer-term memory heap).

As shown in FIG. 9, the process then continues to read further entries in the bounding box hierarchy binning data structure to identify all packets in the region for which geometry processing has been deferred and to trigger that geometry processing appropriately.

A shading tracker (circuit) 8135 for the deferred shading control unit 8130 maintains appropriate counters to track the packets for which deferred geometry shading is being performed for a region, and to correspondingly track when all the deferred geometry processing of packets for the region has been completed. To facilitate this, as shown in FIG. 8, the shading tracker 8135 will receive responses from the shader cores indicating when the deferred geometry processing for a packet has been completed, so that it can then decrement the corresponding region counter.

Once a deferred geometry shading counter for a region has been decremented to 0, that is taken as indicating that the geometry processing for all the deferred packets in the region has been completed, such that the geometry processing will then have been completed for all the packets for the region in question, such that the fragment processing (rendering) for the region can proceed. This is signalled to an appropriate region issue circuit 8136 (FIG. 8), which issues an appropriate "region" run_fragment command to the task issuer for the task issuer to issue appropriate fragment processing tasks for the region in question.

FIG. 10 illustrates this operation and shows that in response to geometry shading completion responses received from the shader cores, the shading tracker 8135 will decrement the appropriate region deferred geometry shading tracking counter (steps 160, 161) and when the counter for a region is 0 (step 162) generate a "modified" run_fragment command for the region in question (step 163) and send that "modified" run_fragment command to the task issuer (step 164). Then, once the fragment shading for the region has been completed (step 165), the memory allocation used for the region in question will be deallocated (step 166).

This process will be repeated each time the deferred geometry shading for packets for a render output region has been completed, so as to trigger the appropriate fragment shading for each respective region that the render output has been divided into.

Although the present embodiments show the deferred shading control unit 8130 as being part of the fragment iterator in the job control unit 39, that deferred shading control unit and process can be located and performed elsewhere in the graphics processor, if desired. For example, it could be part of (e.g. at the end of) the geometry packet pipeline, if desired.

Once an appropriate run fragment command has been sent to the task issuer, the task issuer will then issue appropriate rendering/fragment processing tasks to the fragment endpoints 38 of the shader cores 32 for respective rendering tiles accordingly.

The tasks will indicate an appropriate set of one or more tiles to be rendered by the shader core in question, together with an indication of the rendering/fragment processing that is to be performed for the tiles. The fragment endpoint 38 will then use the binning data structures generated by the distributed binning cores to identify the packets and primitives to be processed for a tile that they are processing, and perform appropriate rendering/fragment processing for the primitives in question for the tile in question.

The rendering/fragment processing that is performed for primitives and for a tile can comprise any suitable and desired rendering/fragment processing that can be performed, such as rasterising primitives to fragments and then performing fragment shading for the fragments, and/or performing ray tracing operations, etc.

Once a shader core has processed a tile, that tile will be written out to memory and the shader core will process the next tile (if any) that it is to process, and so on. This will be continued until the render output in question has been entirely generated.

This process will then be repeated for the next render output, and so on.

As discussed above with reference to FIG. 6, for example, in the present embodiments, the memory heap that is used for storing the packets that have been processed in the technology described herein is configured and used as two separate "sub-heaps", one heap that is used to store packets that need to be retained for a longer period of time, and another heap that is used to store packets that need to be retained for a shorter period of time.

In particular, as discussed above, any packets that are generated as a result of performing deferred geometry processing at the rendering stage are, preferentially, stored in a "short-lived" heap, which is allocated and used while processing a given render output region. Thus there will be a short-lived heap that is allocated for a region and used for storing any newly generated packets when performing deferred geometry shading for packets in the region, but which short-lived heap is then de-allocated once rendering (fragment shading) for the region in question has been completed.

Thus this short-lived heap will be allocated and used on a region-by-region basis. (When de-allocating a short-lived heap when the rendering (fragment shading) for a region has been completed, the data may also be invalidated at that point to prevent old data from spilling into external memory, if desired.)

The other, longer-lived memory heap is in an embodiment allocated and used for a given render output being processed, and thus will be allocated and de-allocated on a per render output basis. Thus this heap will remain valid and in use whilst all of the regions for the render output in question are being processed (and will be de-allocated when the last region for the render output in question has been processed). (To facilitate this, if appropriate, the "long-lived" and "short-lived" sub-heaps can be merged when the last region for a render output is being processed, to assist de-allocating all the memory allocation that has been used by the render output, if desired.)

FIGS. 11-14 illustrate this.

Figure 11:
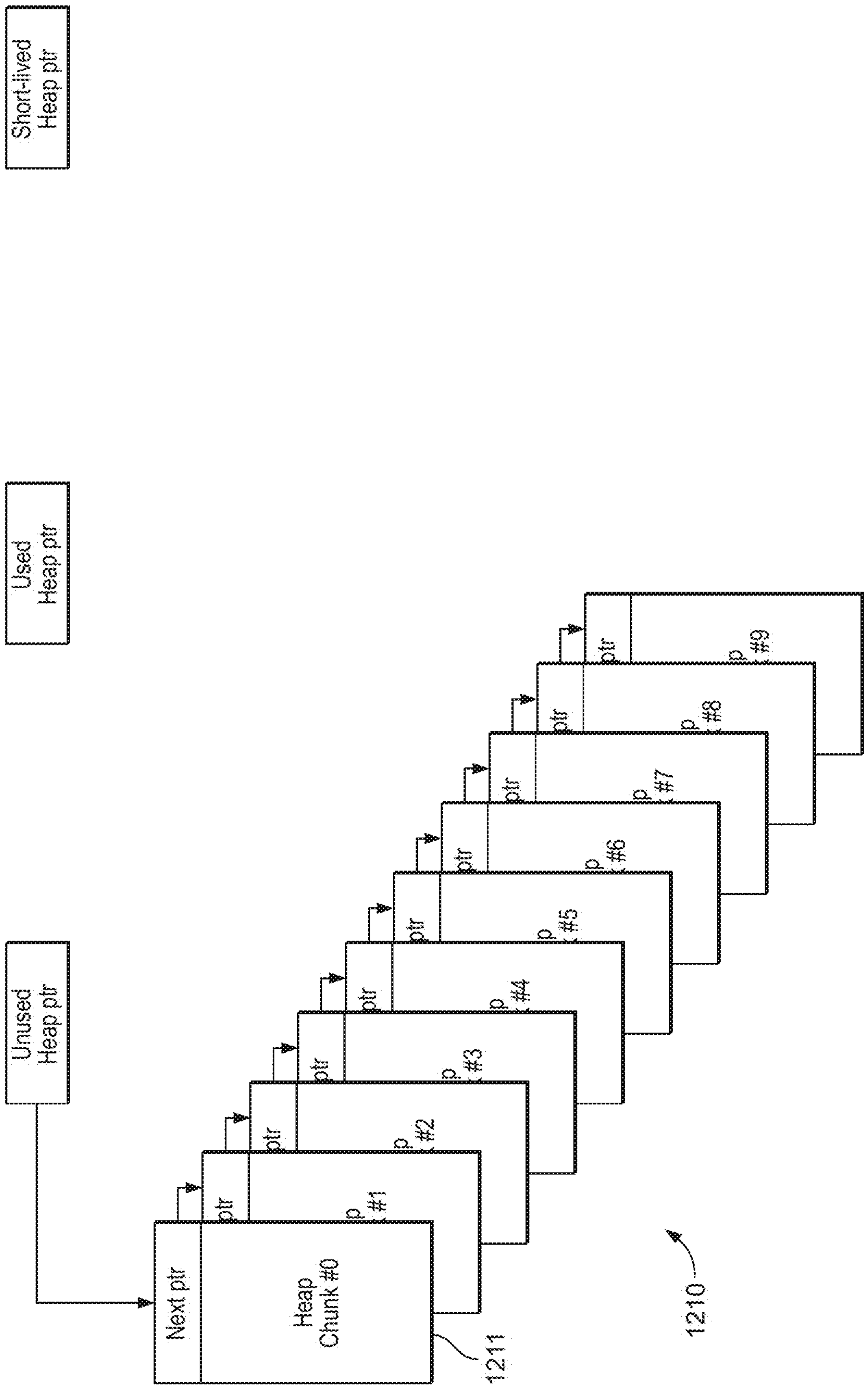
FIGS. 11, 12, 13 and 14 show the use of memory heaps in embodiments.

As shown in FIG. 11, the memory heap 1210 that will be used for storing the packets in the present embodiments is organised as an appropriately linked sequence of heap "chunks" 1211. When a memory allocation for storing packets is required, then appropriate allocation of heap chunks will be requested.

Figure 12:
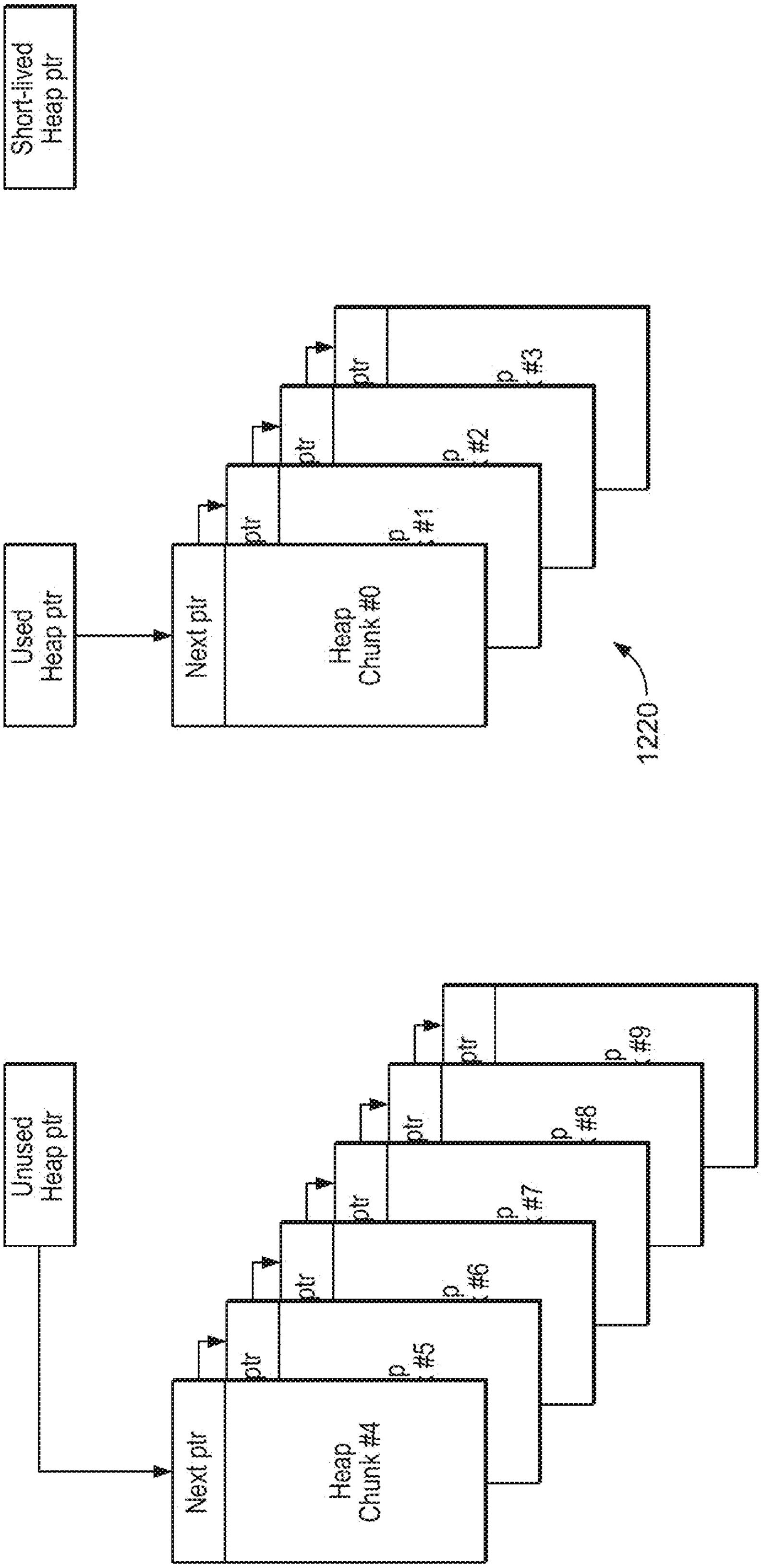

As shown in FIG. 12, when performing the initial (not-deferred) geometry processing, appropriate heap chunks will be allocated to a "long-lived" heap 1220 for storing the packets that are generated by the geometry processing pipeline. These packets and heap chunks will remain valid and in use until the rendering for the render output in question has finished. Thus the "long-lived" heap 1220 will be used to store primitive packets for which the geometry processing and binning processing has been completed at the binning stage, together with the appropriate bounding box hierarchy binning data structure or structures. Any "input" packets that are required for performing any deferred geometry processing are also stored in the "long-lived" heap.

Figure 13:
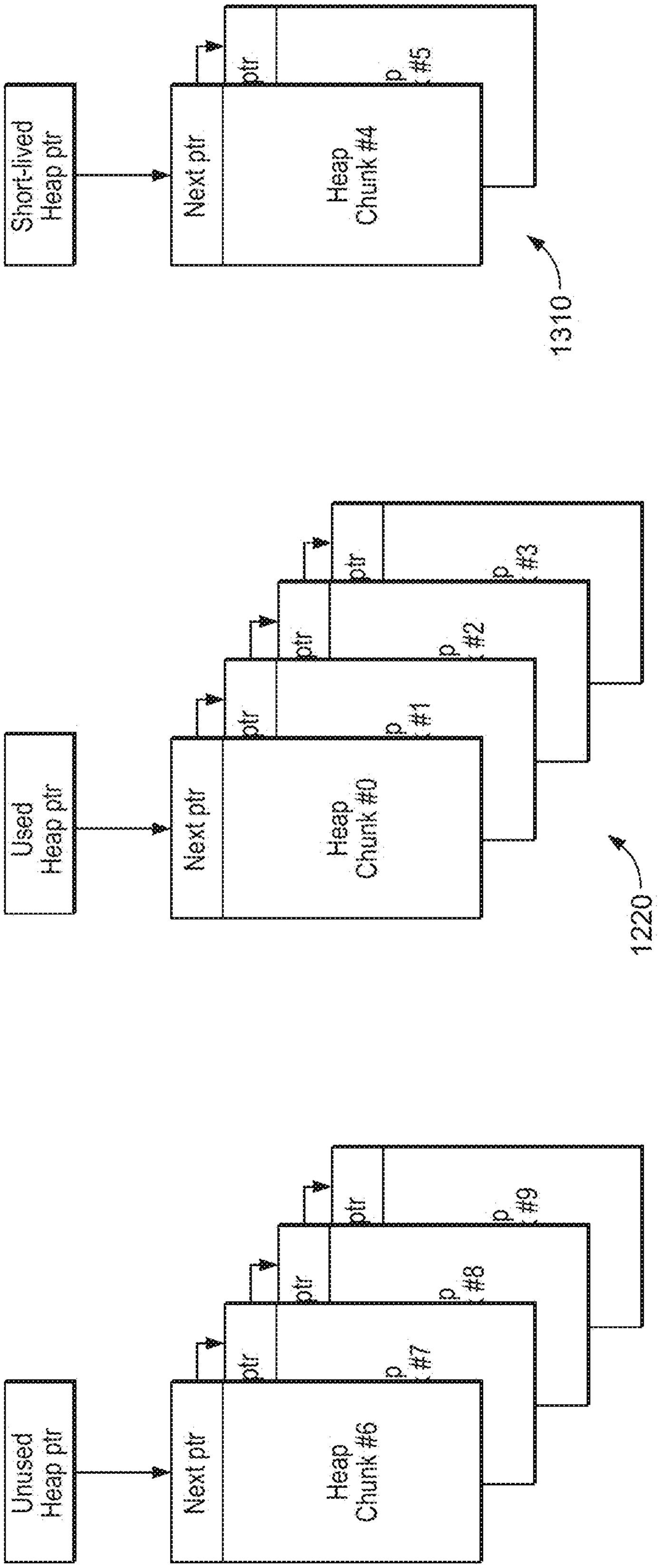

As shown in FIG. 13, when deferred geometry processing is being performed at the rendering stage, appropriate heap chunks will be allocated for storing the processed packets from that geometry processing in a "short-lived" heap 1310, which will be de-allocated once the rendering for the render output region in question has been completed.

Once the rendering (fragment processing) of a region has been completed, the heap chunks in the short-lived heap 1310 are de-allocated and circulated back to the unused heap chunks for re-use.

Once the entire render output has been completed, then the heap chunks in the "long-lived" heap 1220 are de-allocated and circulated back to the unused heap chunks for reuse.

Figure 14:
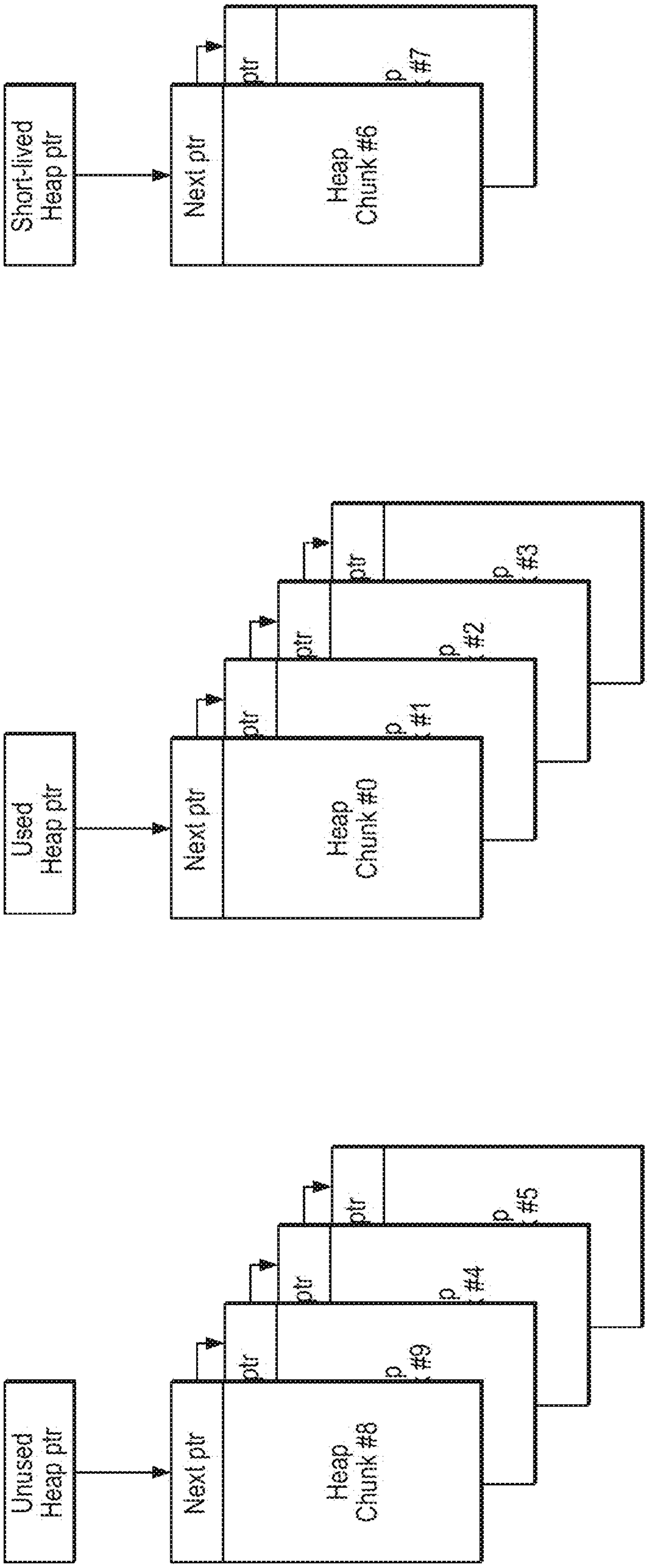

FIG. 14 illustrates this and shows, for example, the heap usage for a next region being processed. Thus in this case, the heap chunks in the short-lived heap for the previous region have been returned to the unused heap chunks for reuse, and new heap chunks have been assigned to a short-lived heap for use for the region now being processed.

Figure 15:
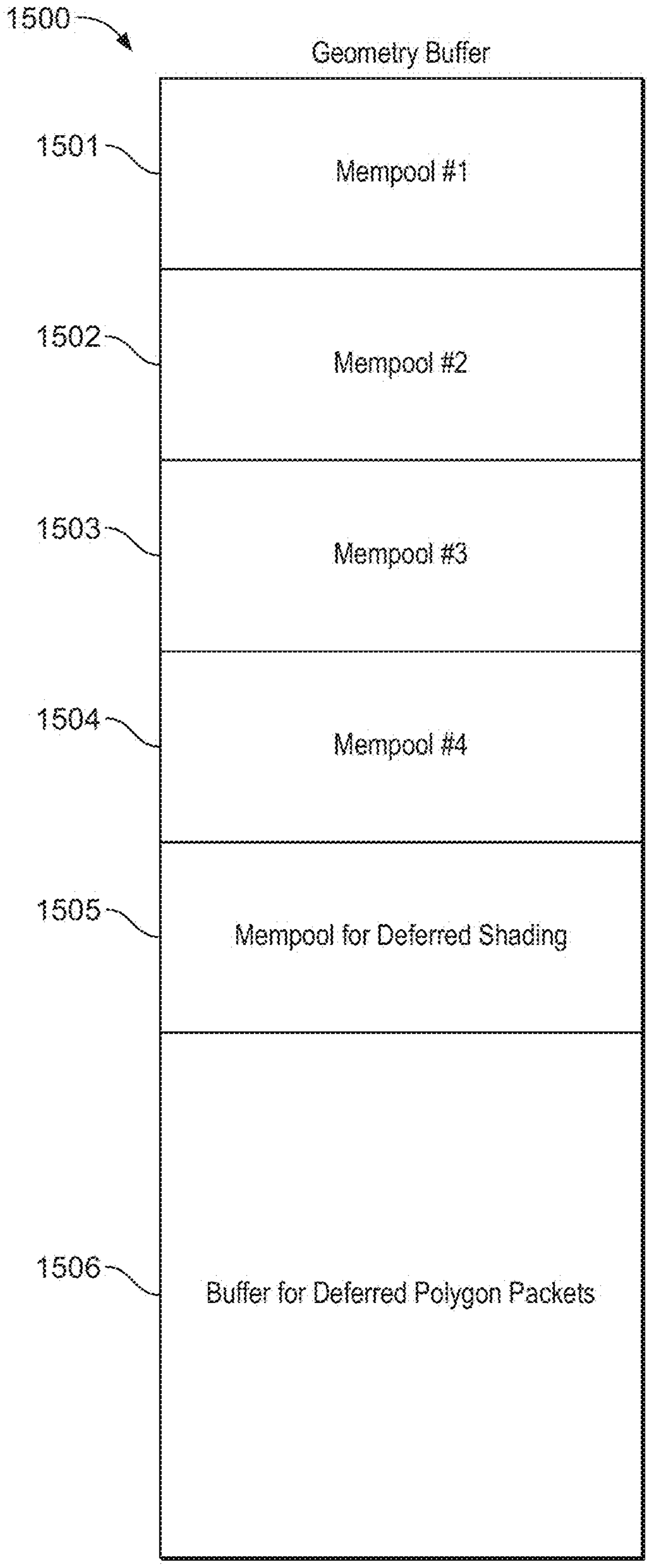
FIG. 15 shows the layout of a geometry buffer in an embodiment.

FIG. 15 shows an exemplary layout of the geometry buffer where the various data is stored in the present embodiment (which geometry buffer will use heap chunks as illustrated in FIGS. 11-14).

As shown in FIG. 15, the geometry buffer 1500 may include, e.g. four memory pools 1501, 1502, 1503 and 1504 that are used by the geometry packet pipeline during processing of the geometry. There is then a further memory pool 1505 that is used for geometry packets when performing deferred geometry shading, and a buffer 1506 for storing processed primitive packets created from deferred geometry shaded packets. The size of this buffer 1506 may set the limit for the number of packets for which geometry processing can be deferred.

As will be appreciated from the above, the technology described herein, in embodiments at least, can provide improved tile-based graphics processing pipeline operation, in particular in relation to the memory bandwidth that is consumed by storing intermediate data between the geometry processing and rendering stages of a graphics processing pipeline being executed. This is achieved, in embodiments of the technology described herein at least, by deferring some geometry processing to the rendering stage, and then performing that geometry processing at the rendering stage, prior to the rendering processing.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of operating a graphics processor when executing a tile-based graphics processing pipeline to generate an output, the graphics processing pipeline being executed comprising:

- a sequence of one or more geometry processing stages to perform geometry processing;
- a binning stage that generates data structures for identifying geometry to be processed for respective rendering tiles of a render output being generated; and
- a rendering stage for rendering tiles of a render output being generated;

the method comprising:

- performing at least some geometry processing of the sequence of one or more geometry processing stages of the graphics processing pipeline to generate respective packets for processing, each packet storing data for geometry to be processed;
- determining, for a packet, whether to defer some of the geometry processing of the sequence of one or more geometry processing stages of the graphics processing pipeline being executed until the rendering stage;
- when it is determined to defer some of the geometry processing for a packet to the rendering stage, omitting from an initial geometry processing operation, prior to the binning stage, at least some of the geometry processing that is determined to be performed in a deferred manner, associating with the packet an indication that further geometry processing should be performed for the packet at the rendering stage, and performing the deferred geometry processing at the rendering stage; and when it is other than determined to defer geometry processing for the packet to the rendering stage, performing all of the sequence of one or more geometry processing stages for the graphics processing pipeline being executed for the packet before providing the packet to the binning stage;

wherein the determination of whether to defer some of the geometry processing for a packet to the rendering stage uses a bounding box for a packet; and a bounding box for a packet is determined by one or more of:

triggering position shading to provide appropriately transformed vertex positions for vertices for primitives in the packet to allow a bounding box for the packet to be determined;

using information from an application that defines a bounding volume for the packet and a way to transform the bounding volume to derive a bounding box for the packet; and using information that has been generated by a geometry processing stage that has already been executed for the packet.

2. The method of claim 1, wherein the geometry processing that is deferred for a packet comprises one of: vertex shading; mesh shading; tessellation evaluation shading; or geometry shading.

3. The method of claim 1, comprising, for a packet for which some of the geometry processing is deferred until the rendering stage:

storing in a binning data structure an indicator indicating that geometry processing for the packet has been deferred, and information for performing the deferred geometry processing for the packet.

4. The method of claim 1, wherein:

geometry processing for a packet is not deferred when a bounding box for the packet is larger than a threshold size.

5. The method of claim 1, wherein:

the determination of whether to defer some of the geometry processing for a packet to the rendering stage takes account of the amount of data that would be generated and need to be stored at the rendering stage when performing the deferred geometry processing for the packet.

6. The method of claim 1, wherein:

a render output is divided into a plurality of regions for the purposes of determining whether to defer some of the geometry processing for packets to the rendering stage.

7. The method of claim 1, comprising:

for a render output being generated, dividing the render output into a plurality of regions for the purposes of determining whether to defer geometry processing for packets; and for each region that the render output has been divided into, maintaining an estimate of the amount of data to be stored when performing geometry processing that has been deferred to the rendering stage for the region of the render output; and when the amount of data to be stored when performing geometry processing that has been deferred to the rendering stage for the render output for a region reaches a permitted threshold value, not deferring the geometry processing of any more packets for the region for the render output.

8. The method of claim 1, wherein:

a render output is divided into a plurality of regions for the purposes of determining whether to defer some of the geometry processing for packets to the rendering stage; and the geometry processing for a packet is not deferred when a bounding box for a packet extends over plural of the regions that the render output has been divided into for the purposes of considering whether to defer the geometry processing for packets.

9. The method of claim 1, comprising:

after the binning stage has generated the binning data structure or structures that can be used to determine whether packets storing data for geometry to be processed should be processed for a rendering tile, for each of a plurality of regions that the render output has been divided into:

using the binning data structure(s) to identify packets storing data for geometry to be processed that need to be processed for the region of the render output;

determining whether any of the packets identified as needing to be processed for the region of the render output require further geometry processing to be performed for them;

for any packets that have been identified as requiring further geometry processing to be performed, performing the further geometry processing; and rendering the region using the results of the further geometry processing when processing the packets for the region.

10. A graphics processor comprising:

processing circuits configured to execute a tile-based graphics processing pipeline to generate an output, the graphics processing pipeline being executed comprising:

a sequence of one or more geometry processing stages to perform geometry processing;

a binning stage that generates data structures for identifying geometry to be processed for respective rendering tiles of a render output being generated; and a rendering stage for rendering tiles of a render output being generated;

wherein:

the geometry processing stage or stages of the graphics processing pipeline generate respective packets for processing, each packet storing data for geometry to be processed;

the graphics processor further comprising:

a processing circuit configured to:

determine, for a packet, whether to defer some of the geometry processing of the sequence of one or more geometry processing stages of the graphics processing pipeline being executed until the rendering stage;

when it is determined to defer some of the geometry processing for a packet to the rendering stage, omit from an initial geometry processing operation, prior to the binning stage, at least some of the geometry processing that is determined to be performed in a deferred manner, associate with the packet an indication that further geometry processing should be performed for the packet at the rendering stage, and perform the deferred geometry processing at the rendering stage; and when it is other than determined to defer geometry processing for the packet to the rendering stage, trigger the performing of all of the sequence of one or more geometry processing stages for the graphics processing pipeline being executed for the packet before providing the packet to the binning stage;

wherein the processing circuit is configured to determine whether to defer some of the geometry processing for a packet to the rendering stage using a bounding box for a packet; and a bounding box for a packet is determined by one or more of:

triggering position shading to provide appropriately transformed vertex positions for vertices for primitives in the packet to allow a bounding box for the packet to be determined;

using information from an application that defines a bounding volume for the packet and a way to transform the bounding volume to derive a bounding box for the packet; and using information that has been generated by a geometry processing stage that has already been executed for the packet.

11. The graphics processor of claim 10, wherein the geometry processing that is deferred for a packet comprises one of: vertex shading; mesh shading; tessellation evaluation shading; or geometry shading.

12. The graphics processor of claim 10, comprising a processing circuit or circuitry configured to, for a packet for which some of the geometry processing is deferred until the rendering stage:

store in a binning data structure an indicator indicating that geometry processing for the packet has been deferred, and information for performing the deferred geometry processing for the packet.

13. The graphics processor of claim 10, wherein:

geometry processing for a packet is not deferred when a bounding box for a packet is larger than a threshold size.

14. The graphics processor of claim 10, wherein:

the determination of whether to defer some of the geometry processing for a packet to the rendering stage takes account of the amount of data that would be generated and need to be stored at the rendering stage when performing the deferred geometry processing for the packet.

15. The graphics processor of claim 10, wherein:

a render output is divided into a plurality of regions for the purposes of determining whether to defer some of the geometry processing for packets to the rendering stage.

16. The graphics processor of claim 10, comprising a processing circuit or circuits configured to:

divide a render output being generated into a plurality of regions for the purposes of determining whether to defer geometry processing for packets; and for each region that the render output has been divided into, maintain an estimate of the amount of data to be stored when performing geometry processing that has been deferred to the rendering stage for the region of the render output; and when the amount of data to be stored when performing geometry processing that has been deferred to the rendering stage for the render output for a region reaches a permitted threshold value, determine not to defer geometry processing of any more packets for the region for the render output.

17. The graphics processor of claim 10, comprising a processing circuit or circuits configured to:

divide a render output being generated into a plurality of regions for the purposes of determining whether to defer geometry processing for packets; and when a bounding box for a packet extends over plural of the regions that the render output has been divided into for the purposes of considering whether to defer geometry processing for packets, determine not to defer geometry processing for the packet.

18. The graphics processor of claim 10, comprising a processing circuit or circuits configured to:

after the binning stage has generated a binning data structure or structures that can be used to determine whether packets storing data for geometry to be processed should be processed for a rendering tile, for each of a plurality of regions that the render output has been divided into:

use the binning data structure(s) to identify packets storing data for geometry to be processed that need to be processed for the region of the render output;

determine whether any of the packets identified as needing to be processed for the region of the render output require further geometry processing to be performed for them;

for any packets that have been identified as requiring further geometry processing to be performed, trigger the performing of the further geometry processing.

* * * * *